(12) United States Patent
Wang et al.

(10) Patent No.: US 9,593,971 B2
(45) Date of Patent: Mar. 14, 2017

(54) COUNTER MODULE ADAPTOR ASSEMBLY FOR ROTARY GAS METERS

(71) Applicant: ROMET LIMITED, Mississauga (CA)

(72) Inventors: Xinmin Wang, Mississauga (CA); Andrew Smich, Mississauga (CA); Marek Jurys, Cambridge (CA)

(73) Assignee: Romet Limited, Mississauga (CA)

( * ) Notice: Subject to any disclaimer, the term of this patent is extended or adjusted under 35 U.S.C. 154(b) by 0 days.

(21) Appl. No.: 15/228,528

(22) Filed: Aug. 4, 2016

(65) Prior Publication Data

US 2016/0341580 A1 Nov. 24, 2016

Related U.S. Application Data

(62) Division of application No. 14/455,296, filed on Aug. 8, 2014, now Pat. No. 9,435,676.

(51) Int. Cl.
| | | |
|---|---|---|
| G01F 1/07 | (2006.01) | |
| G01F 15/06 | (2006.01) | |
| G01F 15/07 | (2006.01) | |
| G01F 15/075 | (2006.01) | |
| G01F 15/14 | (2006.01) | |

(52) U.S. Cl.
CPC ............ *G01F 1/07* (2013.01); *G01F 15/065* (2013.01); *G01F 15/066* (2013.01); *G01F 15/07* (2013.01); *G01F 15/075* (2013.01); *G01F 15/14* (2013.01)

(58) Field of Classification Search
CPC ... G01F 15/14; G01F 3/00; G01F 3/30; G01F 15/065; G01F 15/066
See application file for complete search history.

(56) References Cited

U.S. PATENT DOCUMENTS

| | | | |
|---|---|---|---|
| 3,425,275 A | 2/1969 | Russell, Jr. et al. | |
| 4,910,519 A | 3/1990 | Duell et al. | |
| 5,456,107 A | 10/1995 | Padden et al. | |
| 7,171,852 B2 | 2/2007 | Smich et al. | |
| 2006/0081068 A1* | 4/2006 | Sallee | G01F 3/10 73/861.88 |

* cited by examiner

*Primary Examiner* — Geoffrey Mruk
(74) *Attorney, Agent, or Firm* — Bereskin & Parr LLP/S.E.N.C.R.L., s.r.l.

(57) ABSTRACT

An apparatus for use with a backup counter module, the apparatus having: a housing having a first end for coupling the housing to a gas meter body, and a second end for coupling an electronic counter module to the housing; and the second end having an inner surface with at least two sets of backup counter module engagement features for securing an output end of a backup counter module in one of at least two backup counter module positions. The housing may be coupled to a first gas meter body with a backup counter module positioned within the housing in one of the at least two backup counter module positions. The housing may alternatively be coupled to a second gas meter body with the backup counter module positioned within the housing in another of the at least two backup counter module positions.

6 Claims, 27 Drawing Sheets

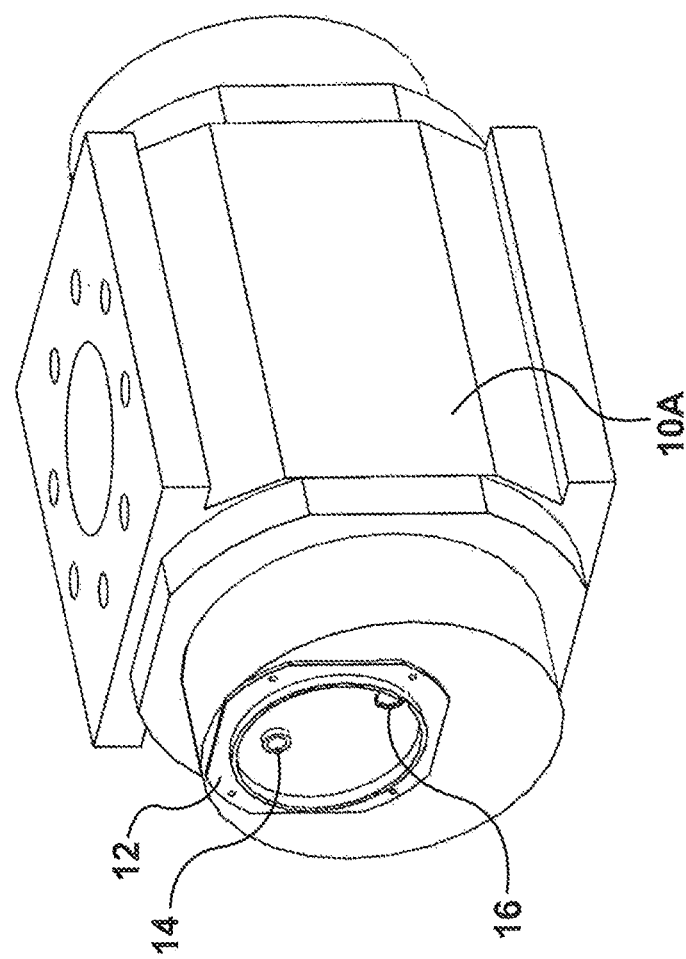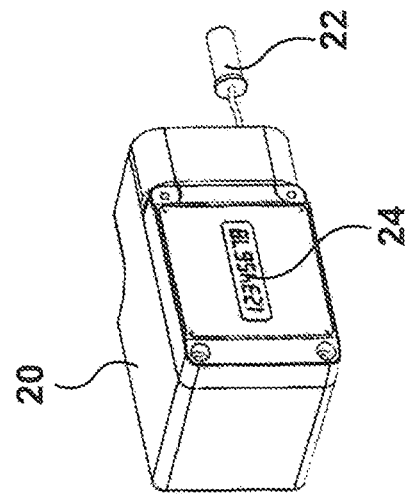
FIG. 1

COUNTER MODULE ADAPTOR ASSEMBLY FOR ROTARY GAS METERS

This application is a divisional of U.S. patent application Ser. No. 14/455,296 filed on Aug. 8, 2014.

FIELD

This disclosure relates generally to gas meter equipment, and more specifically to an adaptor assembly for rotary gas meters.

INTRODUCTION

Gas meters may be used to measure volumes of gas transported and/or used for heating or cooling purposes. For large-scale and/or industrial uses, most gases are typically sold on a price-per-volume basis (e.g. $5 per 1,000 cubic feet). Accordingly, it is generally considered desirable to measure gases being transported and/or used with a relatively high degree of accuracy. For example, natural gas may be characterized as a relatively expensive commodity, and it is important to accurately measure the amount of gas being transported and/or consumed, particularly at high volume rates. Accurate measurement may prevent a consumer from being overcharged by a provider, and it may also ensure that the consumer is charged for the entire volume of gas provided.

A common method of providing accurate measurement of a consumed gas is the use of one or more positive displacement rotary gas meters. When gas flows through such a rotary gas meter, fixed volumes of gas are displaced by, for example, two figure-eight impellers that rotate in opposite directions within a cylinder of known volume. The impellers of the gas meter rotate because of a lower differential pressure at the outlet of the meter than is present at the inlet. As they rotate, a fixed volume of gas or other fluid is entrapped and then moved toward the outlet. Therefore, with each full rotation of the impellers, a known volume of gas or other fluid is displaced through the outlet.

By measuring the number of rotations of the impellers, the volume of gas or other fluid displaced over a period of time can be determined. Also, as the lobed figure-eight impellers remain in a fixed relative position, it is only necessary to measure the rotational movement of one of the impellers. To accomplish this, in the case of positive displacement rotary gas meters that are electronically compensated, the impeller may be magnetically coupled to an electronic recording device.

Typically, a magnetic coupling device senses movement of the impellers by sensing the passage of magnets fixed to the rotating impellers. This may be done with a Wiegand sensor mounted outside the pressure body of the gas meter. The sensor then transfers a signal to the electronic recording device. This electronic device compensates for density changes due to fluctuations in the temperature, pressure, and/or composition of the gas being metered, resulting in an extremely accurate measurement of the consumed gas.

However, electronically compensated gas meters may fail to correctly record the amount of gas volume passing through it for a variety of reasons. The most common failures are due to power loss, faulty electronic components, failures due to lightning, or vandalism. If the electronic module stops recording for any reason, there is a need for a device to account for the flow. It is thought that hundreds of millions, if not billions, of dollars are contested in disputes each year between gas providers and consumers as a result of failures of electronically compensated gas meters.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

Alternatively, or additionally, to an electronic recording device, a gas meter impeller may be coupled to a mechanical register, either directly or through a series of reduction gears. A mechanical register or counter can conveniently account for the flow in the event of a failure of an electronically compensated gas meter. Typically, such mechanical registers display the unconverted volume of consumed gas (e.g. the volume of gas that passed through the gas meter body, without compensating for density changes due to fluctuations in the temperature, pressure, and/or composition of the gas being metered). This volume displayed by a mechanical register may be used to determine the amount of gas that has flowed through the pressure body. Where a gas meter body is provided with electronic recording device and a mechanical register, the mechanical register may act as a backup to the electronic recording device.

Typical mechanical registers have a complicated gear assembly that is mechanically actuated by the rotation of the impellers of the gas meter. That is, gas flowing through the meter causes rotation of the impeller of the gas meter, the impeller drives a first gear member in a series of gear members, and the gear members in turn drive the uncorrected volume register.

A manufacturer of gas meter bodies may provide a common electronic counter module mounting surface on a number of models and/or sizes of gas meter bodies to which an electronic counter module may be coupled. However, based on the relative location of the impeller within the gas meter body, the location of the impeller (and/or a counter drive shaft operatively coupled to the impeller) relative to the mounting surface may be different for different models and/or sizes of gas meter bodies.

While a typical electronic counter module may be used with gas meter bodies having different relative locations of their common mounting surface and counter drive shafts (as the magnetic sensor, typically being connected to the electronic counter module by flexible wiring, may be easily repositioned relative to the mounting surface), the differing relative positions of counter drive shafts may present problems for the use of a mechanical counter with different sizes and/or models of gas meter bodies. This may require the use of a different mechanical counter module and/or a different housing with each different model and/or size of gas meter body.

The apparatus and backup counter module disclosed herein may alternatively be used with gas meter bodies having different relative positioning of their counter drive shaft and mounting surface. The ability to use this universal apparatus and backup counter module with multiple gas meter bodies provides a number of advantages. For example, the number of different mechanical counter modules and/or housings that are required to be brought to a customers facility when installing and/or repairing backup counter modules may be reduced, as the same parts may be used with a wide variety of gas meters.

In accordance with a first broad aspect, there is provided an apparatus for use with a backup counter module, the apparatus comprising: a housing having a first end and a second end, the first end for coupling the housing to a gas meter body, the second end for coupling an electronic counter module to the housing; and the second end having an inner surface and an outer surface, the inner surface having at least two sets of backup counter module engagement features for securing an output end of a backup counter module in one of at least two backup counter module positions; whereby the housing may be coupled to a first gas meter body with a first backup counter module positioned within the housing with an input end of the first backup counter module coupled to a counter drive shaft of the first gas meter body and an output end of the first backup counter module secured in one of the at least two backup counter module positions, and whereby the housing may alternatively be coupled to a second gas meter body with the first backup counter module positioned within the housing with the input end of the first backup counter module coupled to a counter drive shaft of the second gas meter body and the output end of the first backup counter module secured in another of the at least two backup counter module positions.

In some embodiments, the outer surface of the housing is adapted to receive a magnetic sensor operatively coupled to an electronic counter module in one of at least two magnetic sensor positions.

In some embodiments, the outer surface of the housing comprises at least two apertures, each aperture for receiving a magnetic sensor therein.

In some embodiments, the outer surface of the housing comprises an aperture shaped so that a magnetic sensor can be secured in one of at least two magnetic sensor positions within the aperture.

In some embodiments, each of the at least two sets of backup counter module engagement features comprise at least one recess for receiving a complimentary protrusion extending from an output end of a backup counter module.

In some embodiments, the second end of the housing further comprises a bore through which wiring associated with a temperature probe coupled to an electronic counter module may be run.

In some embodiments, the housing further comprises a conduit extending from the bore through which wiring associated with a temperature probe coupled to an electronic counter module.

In some embodiments, the at least two sets of backup counter module engagement features comprises three sets of engagement features, whereby an output end of a backup counter module may be secured in one of at least three backup counter module positions.

In some embodiments, the housing has at least one viewing window positioned such that when a backup counter module is secured in one of the at least two backup counter module positions and the housing is coupled to a gas meter body, a counter display of the backup counter module is visible through the viewing window.

In some embodiments, at least a portion of the housing is translucent.

In some embodiments, at least a portion of the housing is transparent.

In some embodiments, the first gas meter body comprises a gas meter body of a first size, and wherein the second gas meter body comprises a gas meter body of a second size.

In accordance with another broad aspect, there is provided a backup counter module having an input end and an output end, the backup counter module comprising: a frame; a driven shaft mounted to the frame and having an end for coupling to a counter drive shaft of a gas meter body, the driven shaft end located at the input end of the backup counter module; a mechanical counter mounted to the frame and coupled to the driven shaft so that rotation of the driven shaft increments a value of the mechanical counter proportionally to the rotation of the driven shaft; an output shaft connected to the driven shaft through a gear train so that rotation of the driven shaft results in a proportional rotation of the output shaft, the output shaft having a mount for receiving a magnet so that the magnet rotates in direct proportion to rotation of the output shaft, the mount located at the output end of the backup counter module; and one or more housing engagement features at the output end of the backup counter module for securing the output end of the backup counter module in one of at least two backup counter module positions within a housing.

In some embodiments, the one or more housing engagement features comprise at least one protrusion for insertion into a complimentary recess on a housing.

In some embodiments, the magnet comprises a magnet for use with a Wiegand sensor.

In some embodiments, a longitudinal axis of the driven shaft and a longitudinal axis of the output shaft are offset.

In some embodiments, the frame comprises a frame base and two frame plates extending from the frame base, and wherein the driven shaft extends through one of the two frame plates and is connected to the other of the two frame plates via a bearing.

In some embodiments, the gear train is configured such that the output shaft rotates at the same speed as the driven shaft.

It will be appreciated by a person skilled in the art that a method or apparatus disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which:

FIG. 1 is a perspective view of an electronic counter module and a first gas meter body;

Figure 10:
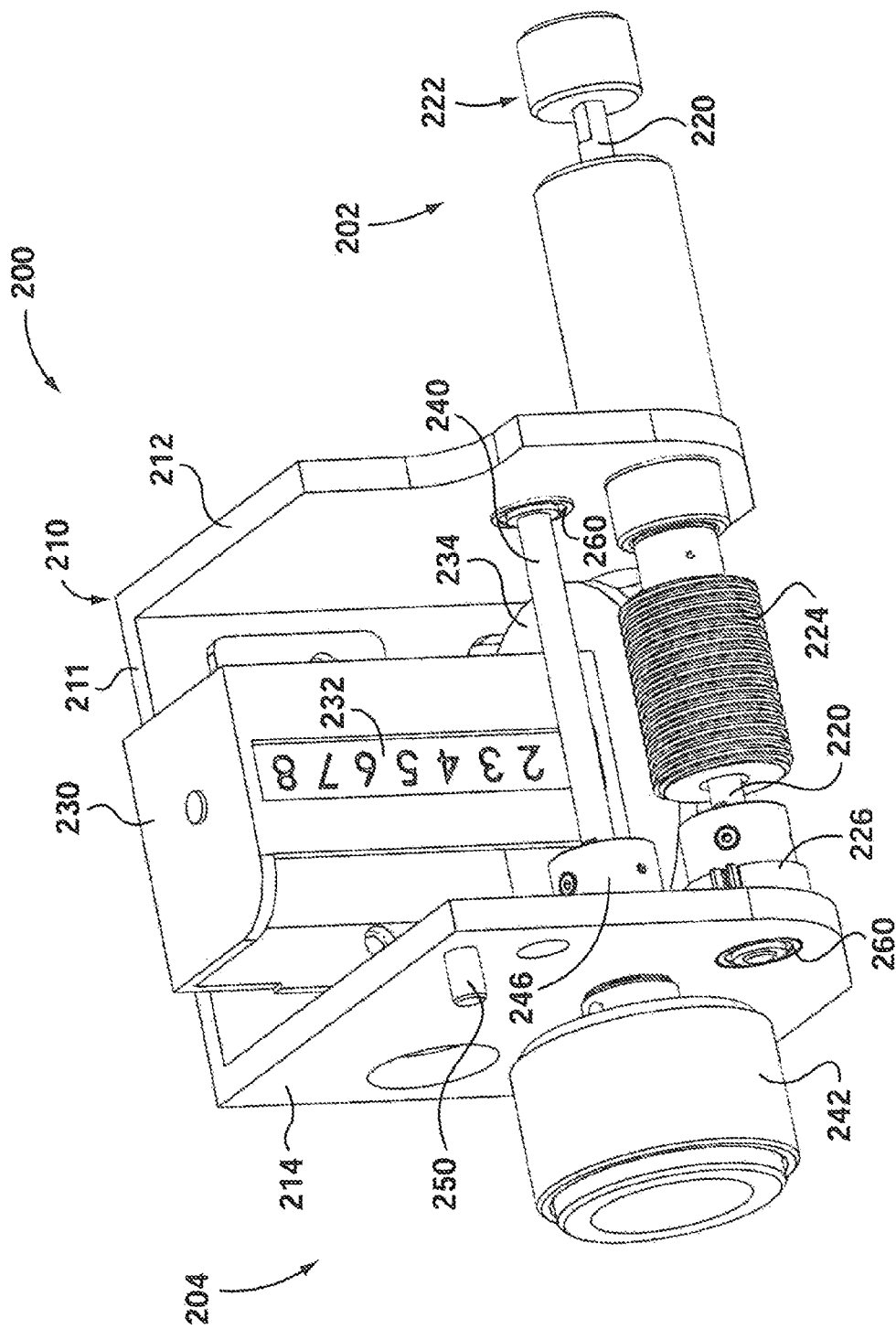
FIG. 10 is another perspective view of the backup counter module of FIG. 8.
Figure 11:
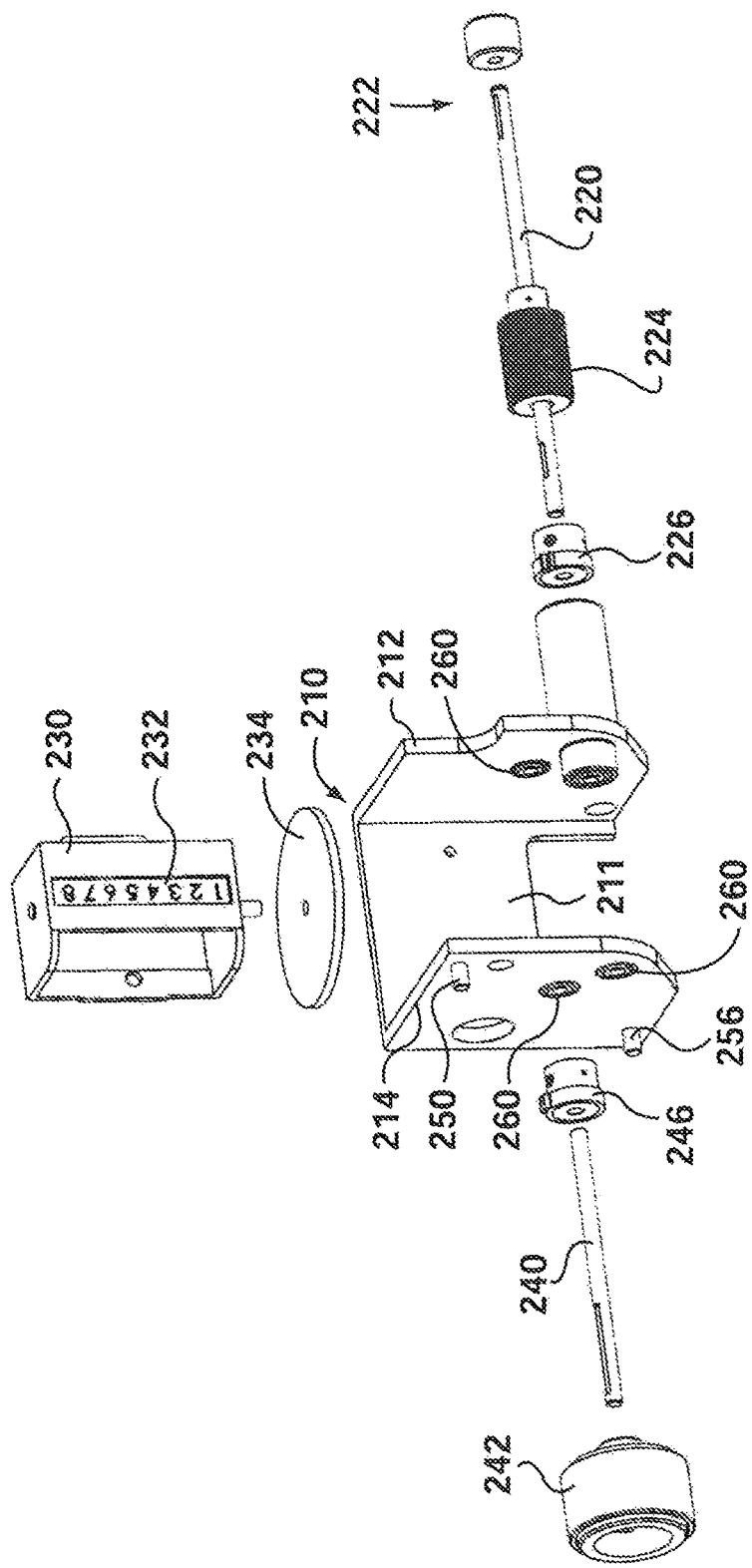
FIG. 11 is an exploded view of the backup counter module of FIG. 8.
Figure 12:
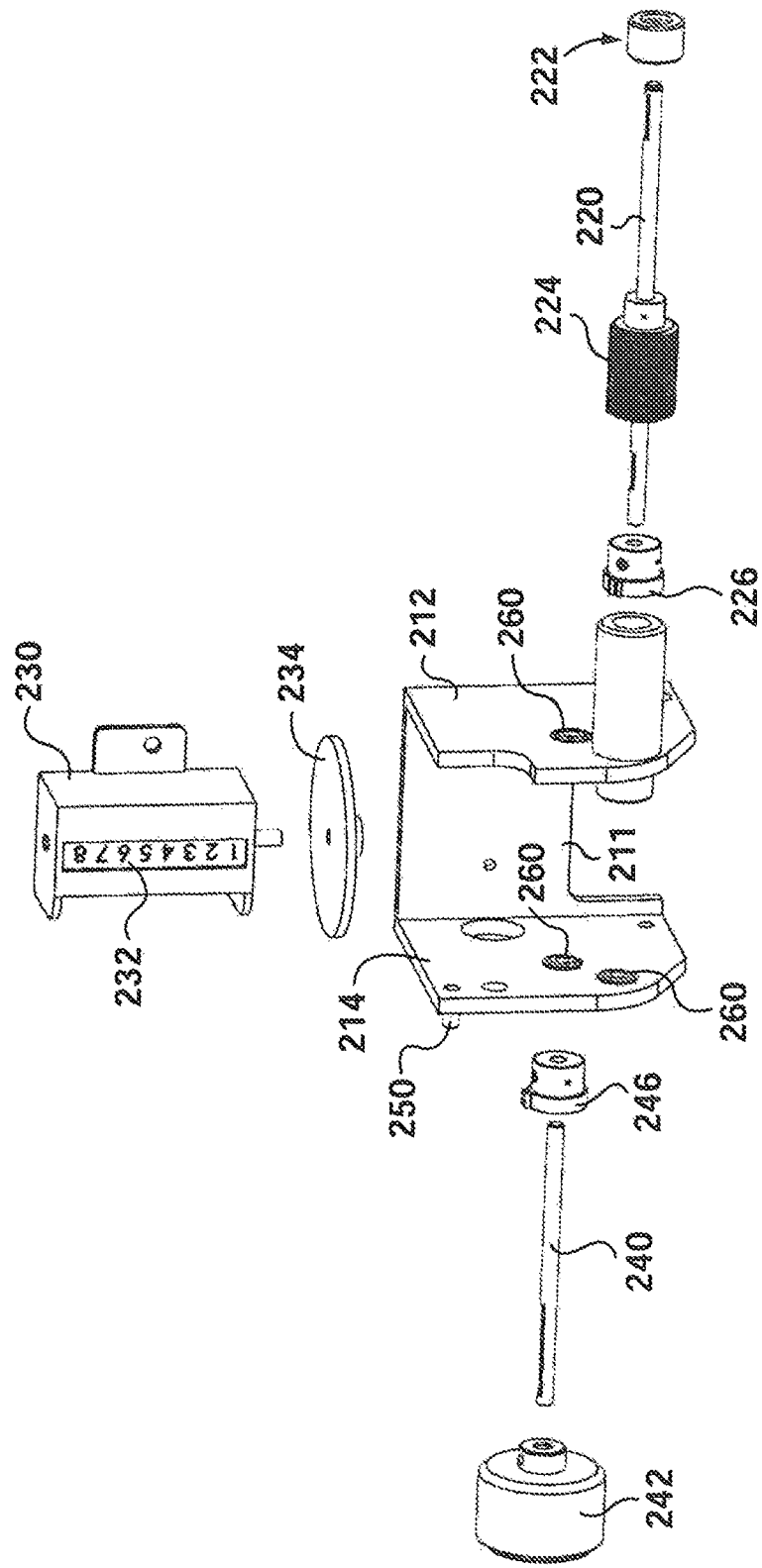
FIG. 12 is another exploded view of the backup counter module of FIG. 8.

It will be appreciated that FIGS. 10 and 11 are for reference only, and that it may not be possible to assemble and/or disassemble the backup counter module with the components in their illustrated configurations.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

While the apparatus and methods disclosed herein are described specifically in relation to conventional positive displacement rotary gas meters, it will be appreciated that the apparatus and methods may alternatively be used with other types of gas meters.

FIG. 1 illustrates a positive displacement rotary gas meter and an electronic counter module. Gas meter body 10A has an aperture 16 for providing access to a counter drive shaft of the gas meter, and an aperture 14 for receiving a temperature probe. As used herein, a counter drive shaft is any shaft of the gas meter body that rotates proportionally to the rotation of the impellers (e.g. lobed figure-eight impellers, or other rotors) and may be used to drive a counter module. For example, a rotor shaft may be used as a counter drive shaft. Gas meter body 10A also has a mounting surface 12 to which an electronic counter module 20 may be secured.

Electronic counter module 20 has a magnetic sensor 22 that may be positioned within aperture 16 of gas meter body 10A for sensing the rotation of the counter drive shaft. A display 24 is provided on electronic counter module 20 for outputting the measured amount of gas that has traveled through the gas meter. Electronic counter module 20 may also have a temperature probe (not shown) for insertion into aperture 14, allowing electronic counter module 20 to provide a temperature-corrected measurement of the volume of gas that has flowed through the gas meter, as is conventionally known.

For example, electronic counter module 20 may be an AdEM™ series electronic counter module as available from Romet Limited.

It will be appreciated that electronic counter module 20 may be coupled directly to gas meter body 10A, and used to measure a volume of gas that has flowed through the gas meter. But electronic counter module 20 may fail to correctly record the amount of gas volume passing through it for a variety of reasons. The most common failures are due to power loss, faulty electronic components, failures due to lightning, or vandalism. To account for a flow of gas without relying on electronic counter module 20, a mechanical counter, module may also be coupled to gas, meter body 10A.

Figure 2:
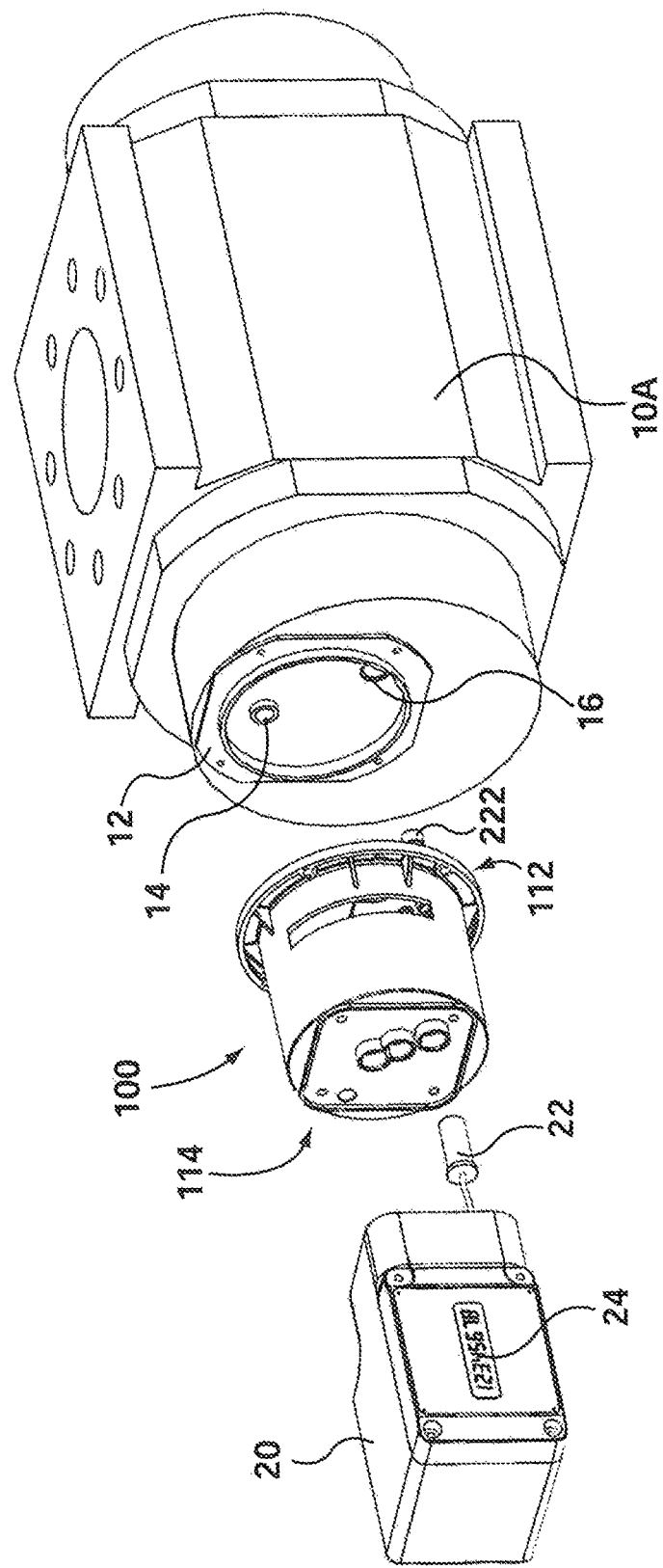
FIG. 2 is a partially exploded view of the electronic counter module and gas meter body of FIG. 1 with an embodiment of an apparatus and backup counter module positioned between the electronic counter module and the gas meter body.
Figure 3:
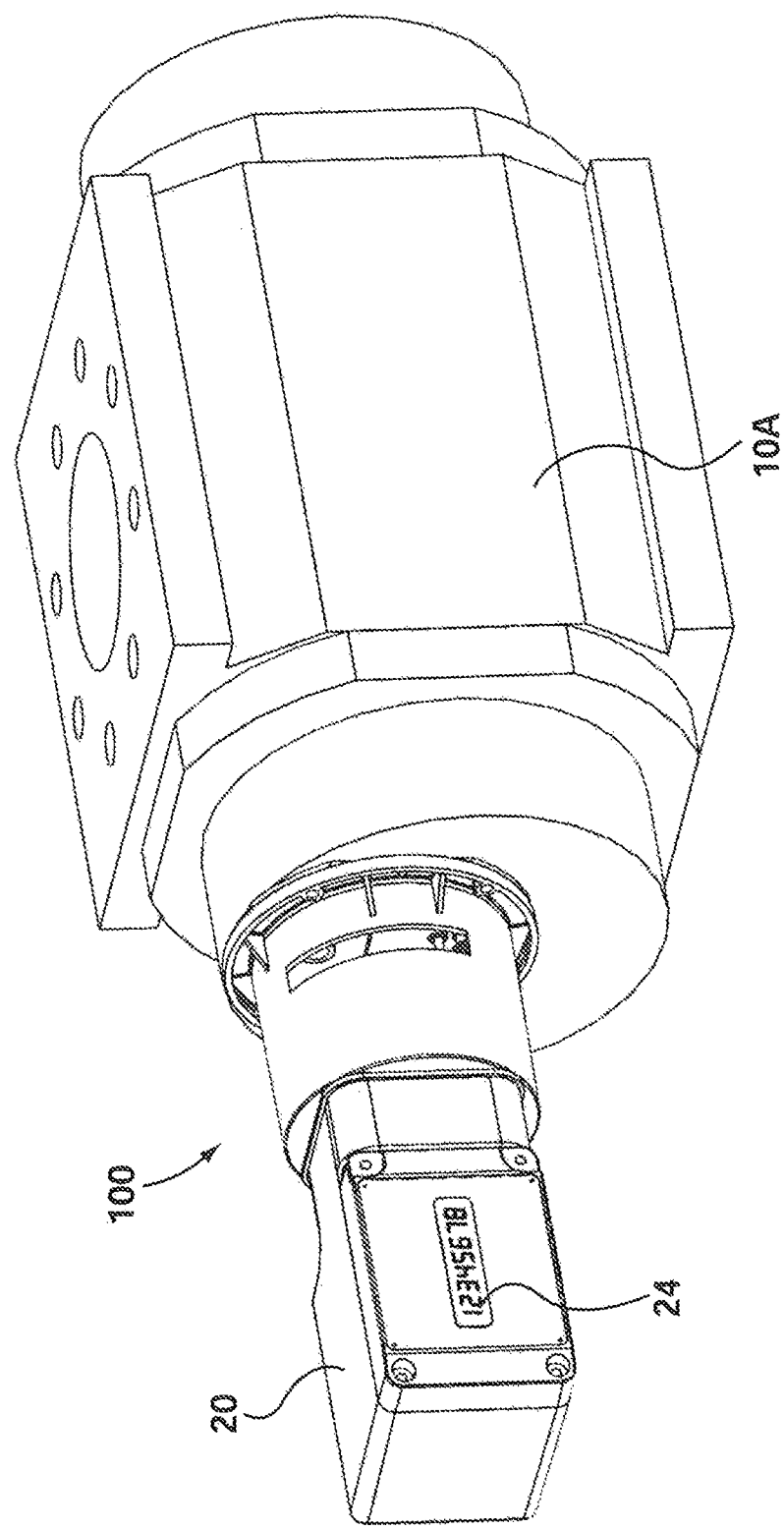
FIG. 3 is a perspective view of the electronic counter module, apparatus and backup counter module, and gas meter body of FIG. 2.
Figure 4:
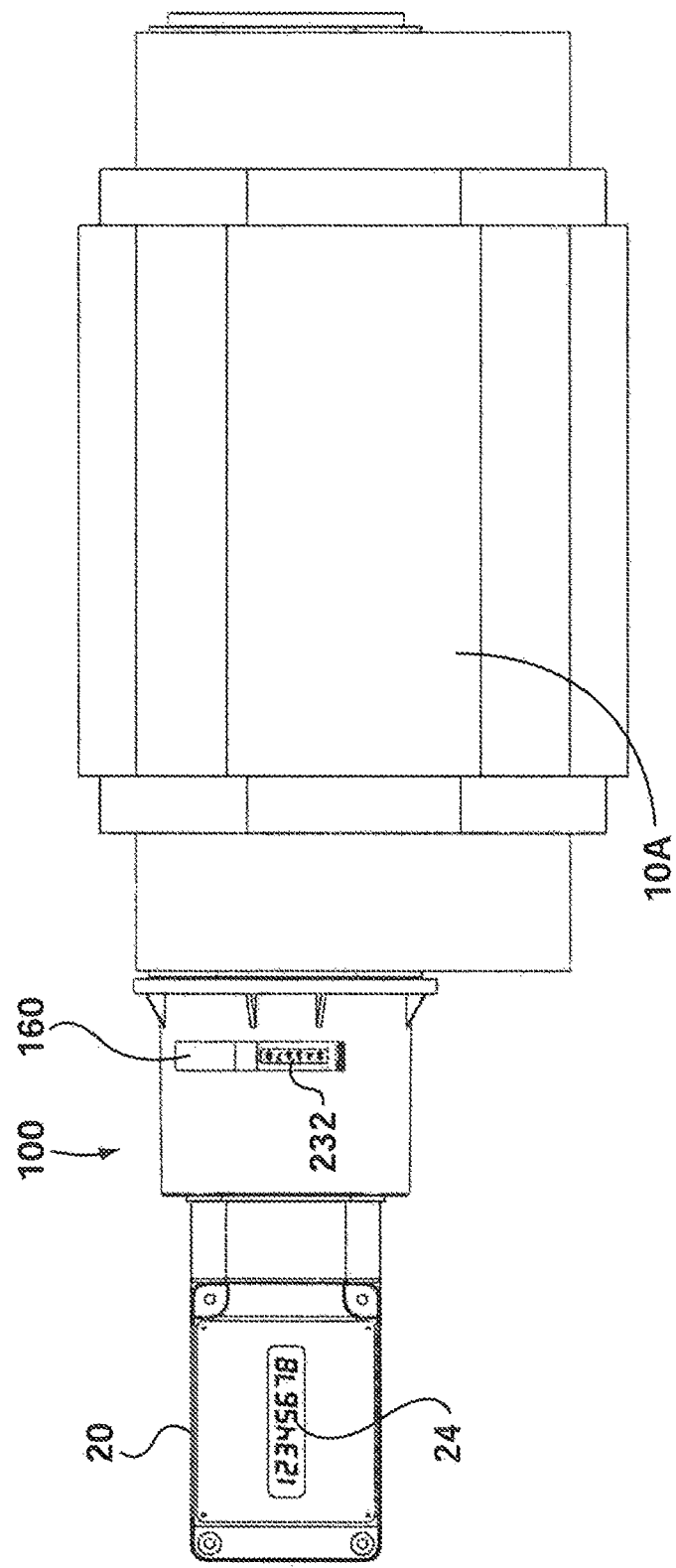
FIG. 4 is a side view of the electron is counter module, apparatus and backup counter module, and gas meter body of FIG. 2.

FIGS. 2-4 illustrate an apparatus for positioning a backup counter module (e.g. a mechanical counter module) between a gas meter body and electronic counter module. More specifically, a first end 112 of a housing 110 of the apparatus 100 is configured to be coupled to the mounting surface 12 of gas meter body 10A, and a second end 114 of housing 110 is configured to be coupled to electronic counter module 20. As will be discussed further below, backup counter module 200 is positioned within housing 110 such that an input end of backup counter module 200 may be coupled to the counter drive shaft of gas meter body 10A, and an output end of backup counter module 200 is secured to an inner surface of the second end 114 of housing 110. In this way, when electronic counter module 20 is coupled to the second end 114 of housing 110, magnetic sensor 22 may be used to sense the rotation of an output shaft of backup counter module 200. Since rotation of the output shaft of backup counter module 200 is proportional to (or equal to, depending on the gearing of backup counter module 200) the rotation of the counter drive shaft of the gas meter, electronic counter module 20 may use magnetic sensor 22 to indirectly sense the rotation of the counter drive shaft of the gas meter.

Figure 5:
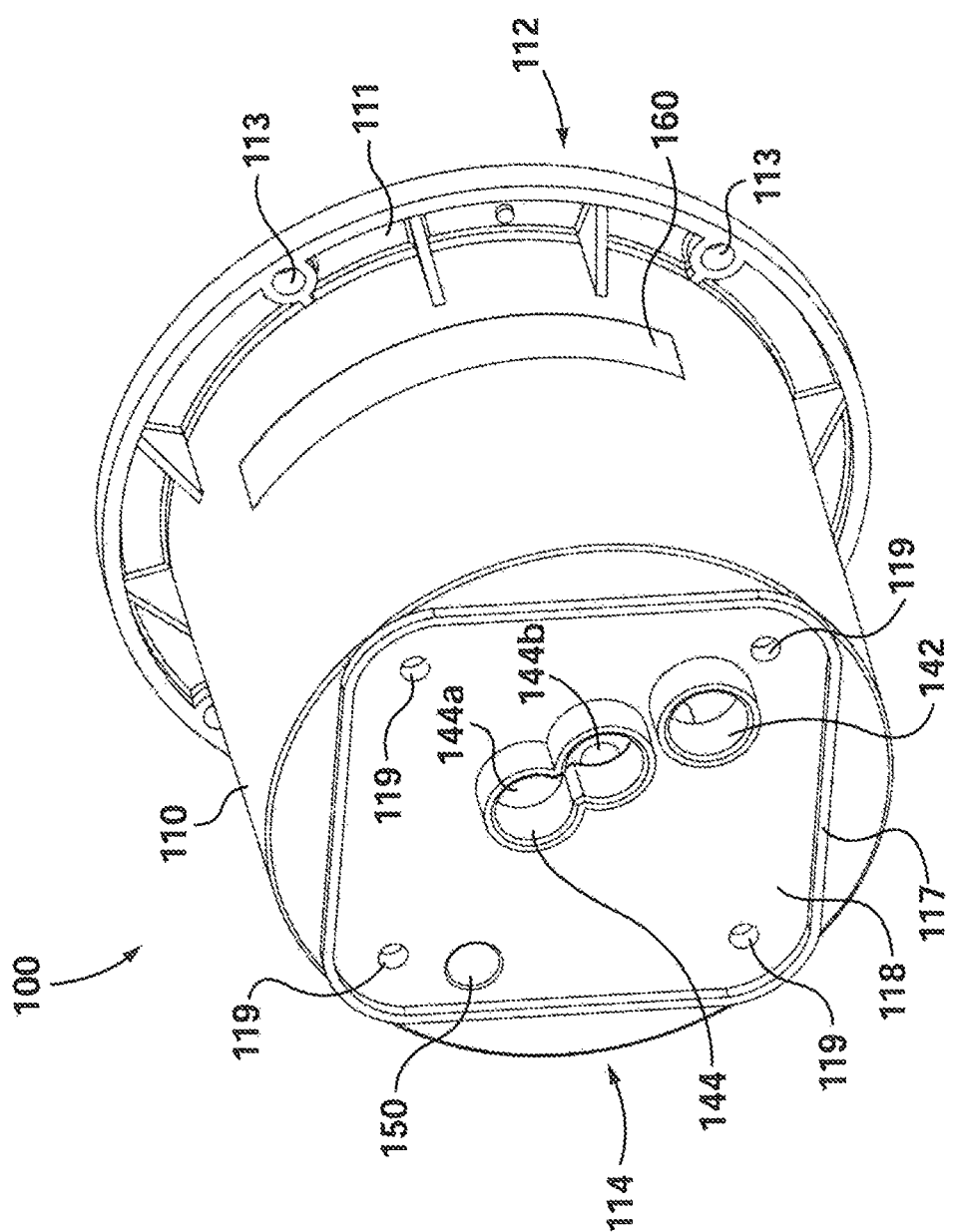
FIG. 5 is a perspective view of one end of an apparatus for use with a backup counter module 200.
Figure 6:
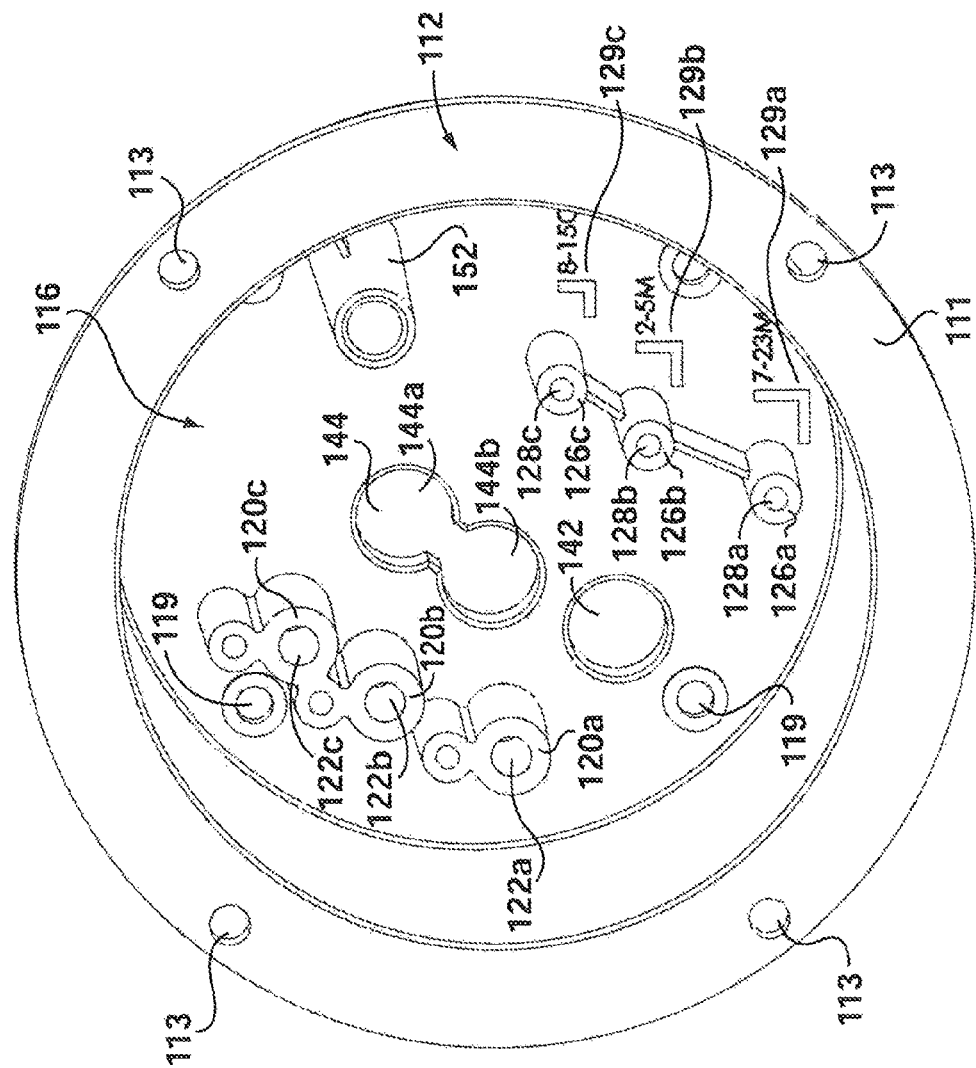
FIG. 6 is a perspective view of another end of the apparatus of FIG. 5.

As exemplified in FIGS. 5 and 6, apparatus 100 comprises a housing 110 having a first end 112 and a second end 114. First end 112 is configured to be coupled to the mounting surface 12 of a gas meter body 10. As shown, first end 112 has an annular flange 111 with a plurality of holes 113 for receiving mechanical fasteners used to secure housing 110 to gas meter body 10. It will be appreciated that first end 112 of housing 110 may be alternatively or additionally coupled to mounting surface 12 of a gas meter body 10 by any suitable means, for example, using a magnetic coupling system.

As best seen in FIG. 5, the outer surface 118 of second end 114 is adapted such that an electronic counter module 20 may be coupled to second end 114. For example, outer surface 118 may be provided with a ridge 117 dimensioned so that ridge 117 and a complementary surface feature on electronic counter module 20 may be placed in abutting relation with each other. It will be appreciated that one or more other surface features may be provided, or no such surface feature may be provided. Alternatively or additionally, second end 114 may be provided with one or more holes 119 for receiving mechanical fasteners used to secure electronic counter module 20 to housing 110. It will be appreciated that electronic counter module 20 may be alternatively or additionally secured to second end 114 by any suitable means, for example, using a magnetic coupling system.

Second end 114 of housing 110 may also be adapted to receive magnetic sensor 22 of electronic counter module 20 in one or more magnetic sensor positions. For example, second end 114 has a circular aperture 142 dimensioned to receive magnetic sensor 22 therein. Second end 114 also has a peanut-shaped aperture 144 dimensioned to receive magnetic sensor 22 in one of two positions (e.g. in either lobe 144a or 144b of the peanut-shaped aperture). It will be appreciated that other shapes and/or sizes of apertures may be provided, depending for example on the dimensions of the magnetic sensor being used.

A bore 150 may optionally be provided in second end 114 to allow a temperature probe and/or associated wiring of electronic counter module 20 to be inserted therethrough, for insertion into aperture 14 of gas meter body 10.

Turning to FIG. 6, inner surface 116 of second end 114 is adapted such that a backup counter module may be alternatively secured in one of a plurality of backup counter module positions. In the illustrated embodiment, a first set of engagement features 120a, 126a each have a corresponding recess 122a, 128a, and each recess 122a, 128a is dimensioned to receive a complimentary protrusion extending from an output end of backup counter module 200. Thus, backup counter module 200 may be secured in a first backup counter module position 130a (see e.g. FIG. 7A) by positioning the complementary protrusions within the recesses 122a, 128a.

It will be appreciated that securing backup counter module 200 in the first backup counter module position 130a aligns the output end of backup counter module 200 in a predetermined position relative to the second end 114 of housing 110. Also, an input end of backup counter module 200 will be aligned in a predetermined position relative to the first end 112 of housing 110.

Figure 7C:
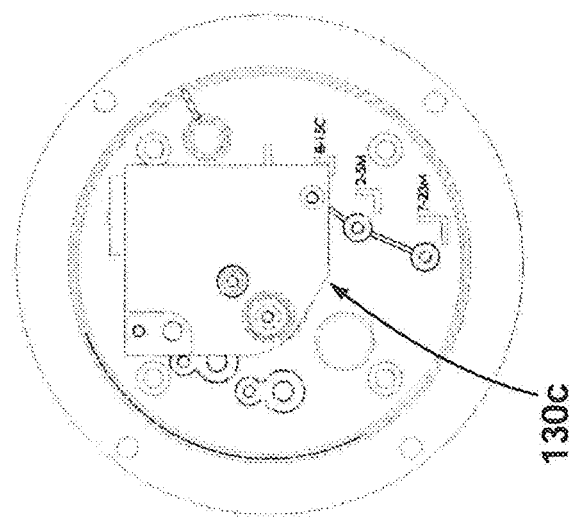
FIG. 7C is an end view of the apparatus of FIG. 5 with a backup counter module secured in a third backup counter module position.
Figure 7B:
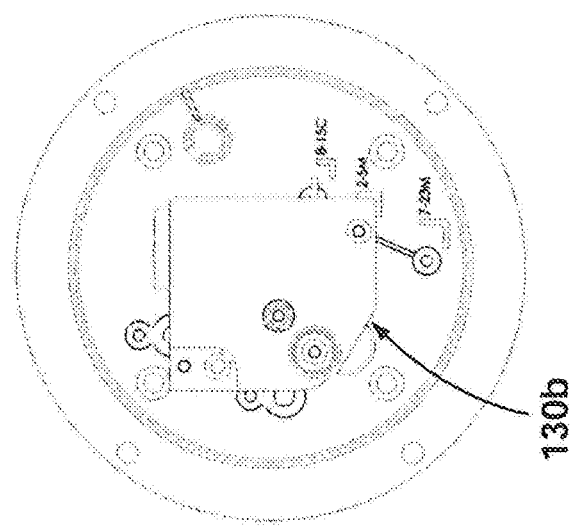
FIG. 7B is an end view of the apparatus of FIG. 5 with a backup counter module secured in a second backup counter module position.
Figure 7A:
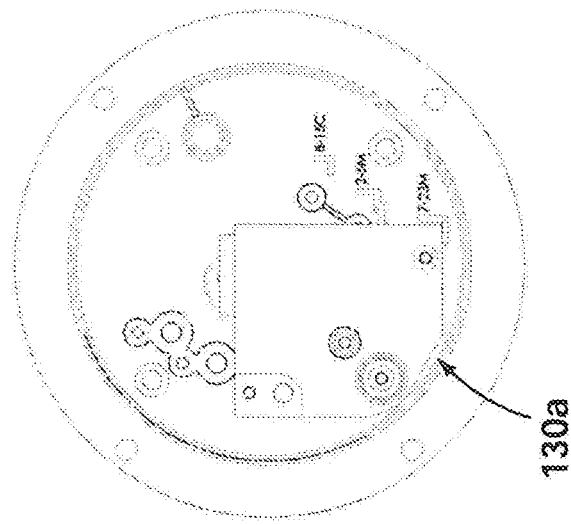
FIG. 7A is another end view of the apparatus of FIG. 5 with a backup counter module secured in a first backup counter module position.

In a similar manner, a second set of engagement features 120b, 126b allow an output end of backup counter module 200 to be secured in a second backup counter module position 130b (see e.g. FIG. 7B), and a third set of engagement features 120c, 126c allow an output end of backup counter module 200 to be secured in a third backup counter module position 130c (see e.g. FIG. 7C).

Optionally, one or more visual aids 129a-c may be provided on inner surface 116 to assist in positioning backup counter module 200 for insertion into engagement features 120a-c, 126a-c.

Returning to FIG. 6, a conduit 152 may optionally be provided between bore 150 and first end 112 of housing 110 to guide and/or protect wiring associated with a temperature probe of electronic counter module 20.

A viewing window 160 may optionally be provided in housing 110 so that a display of a backup counter is visible when housing 110 and backup counter module 200 are installed on a gas meter body and electronic counter module.

It will be appreciated that housing 110 may be made of any suitable rigid material, such as metal, plastic, and the like. Optionally, some or all of housing 110 may be made of a material that is translucent or transparent. For example, viewing window 160 may be made of a translucent or transparent material.

FIGS. 8-12 illustrate a backup counter module (e.g. a mechanical counter module) for use with apparatus 100. Backup counter module 200 has an input end 202 for coupling to a counter drive shaft of a gas meter body, an output end 204 for securing the backup counter module to the housing 110. Backup counter module 200 includes a mechanical counter 230 for tracking a number proportional to the number of rotations of the counter drive shaft.

An advantage of the backup counter module disclosed herein is that, in general, the more complicated the gear train, the more difficult it is to ensure proper measurement of low gas flow rates. By using a gear train with minimal components, the friction in the gear train is reduced and the energy needed to move the gear train and counter is reduced. With a more complicated gear train, a significant proportion of the energy embodied in the gas flow is used to overcome the torque created by the gear train and counter. This may create errors in measuring low flow rates and should be avoided. Also, a simple gear train produces a minimal pressure drop which in turn allows the impellers of the gas meter to rotate in a normal manner. This may increase the accuracy of the measurement of relatively low gas flow rates.

Figure 8:
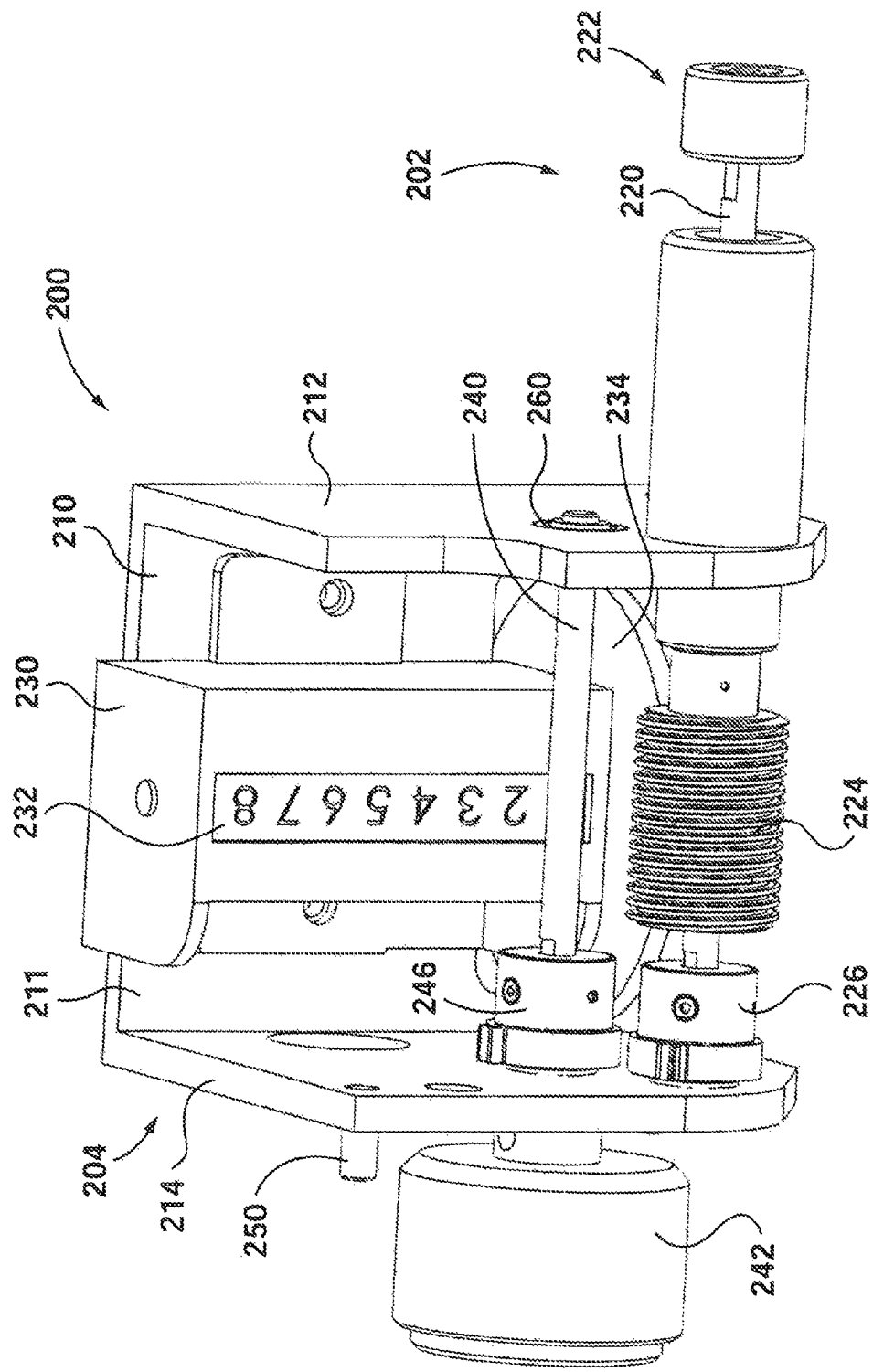
FIG. 8 is a perspective view of an embodiment of a backup counter module.

In the embodiment illustrated in FIG. 8, backup counter module 200 includes a frame 210 having a frame base 210 and two frame plates 212, 214 for rotatingly supporting a driven shaft 220 and an output shaft 240. In the illustrated embodiment, bearings 260 are provided to facilitate rotation of the driven and output shafts relative to frame 210, although it will be appreciated that other arrangements (e.g. using one or more bushings) may alternatively or additionally be used.

Driven shaft 220 has an end 202 configured to be coupled to a counter drive shaft of a gas meter body, so that the driven shaft 220 rotates at a rate proportional to, and preferably at the same rate as, the counter drive shaft. In the illustrated embodiment, a magnet 222 is provided at the end of driven shaft 220. This magnet 222 may be magnetically coupled to a rotor shaft of a gas meter body. It will be appreciated that driven shaft 220 may alternatively or additionally be coupled to a counter drive shaft using any suitable means.

A worm 224 is mounted on driven shaft 220 for meshing with a worm gear 234, which in turn drives mechanical counter 230. In this way, when the counter drive shaft is rotated (e.g. in response to gas flowing through gas meter body 10), mechanical counter 230 is operable to count a number directly proportional to the number of rotations of counter drive shaft. This number is displayed on a display 232 of mechanical counter 230.

While it is preferable to use a worm 224 and worm gear 234 so that the mechanical counter records a fraction of the number of rotations of the driven shaft (and, by extension, of the counter drive shaft), it will be appreciated that any suitable gearing may be used. For example, the gearing may be configured so that the mechanical counter 230 records the number of rotations of the counter drive shaft on a 1:1 basis, or records a multiple of the number of rotations of the driven shaft.

Mechanical counter 230 is illustrated as being mounted to the frame base 210, although it will be appreciated that mechanical counter 230 may alternatively, or additionally, be mounted to one or both frame plates 212, 214.

Also notable in the arrangement shown is that the mechanical counter 230 and its display 232 are oriented transverse to driven shaft 220 and output shaft 240. Such an arrangement may have a number of advantages. For example, rotating mechanical counter 230 may reduce the overall size of backup counter module 200, and in particular the length of the backup counter module 200 between the first end 202 and second end 204 may be shorter than may be required if the mechanical counter were positioned parallel to driven shaft 220 and output shaft 240.

Also, as will be discussed further below, orienting display 232 transverse to driven shaft 220 and output shaft 240 may allow a smaller viewing window 160 to be provided in housing 110 while still allowing display 232 to be visible through viewing window 160 when backup counter module 200 is secured in any one of multiple backup counter module positions 130a-c.

It will be appreciated that that the value appearing on the display 232 of mechanical counter 230 may be manipulated in a variety of ways to determine the amount of gas consumed (e.g. flowed through the gas meter body) over a period of time. For example, a conversion factor based on the type of gas meter being tracked (e.g. by part or make number) may be used. For example, a suitable conversion factor may be determined by calculating the specific displacement generated by each type (or size) of gas meter. Such a conversion factor may be proportional to the size of the gas meter and the gear ratio between the impeller shaft of the gas meter and the mechanical counter 230.

It will also be appreciated that, in addition to acting as a backup for electronic counter module 20, mechanical counter 230 may be used to track a total number of rotations of the counter drive shaft (and thus of the gas meter's impeller) over the life of the gas meter. This may be valuable, as typically it is difficult to measure the life of a gas meter. Since mechanical counter 232 may be operable to count throughout the operational life of the gas meter, the value displayed on the display 232 may be used as a proxy for the operational age of the gas meter, e.g. to provide a measure of future life expectancy and/or the future operational value of the gas meter.

Figure 9:
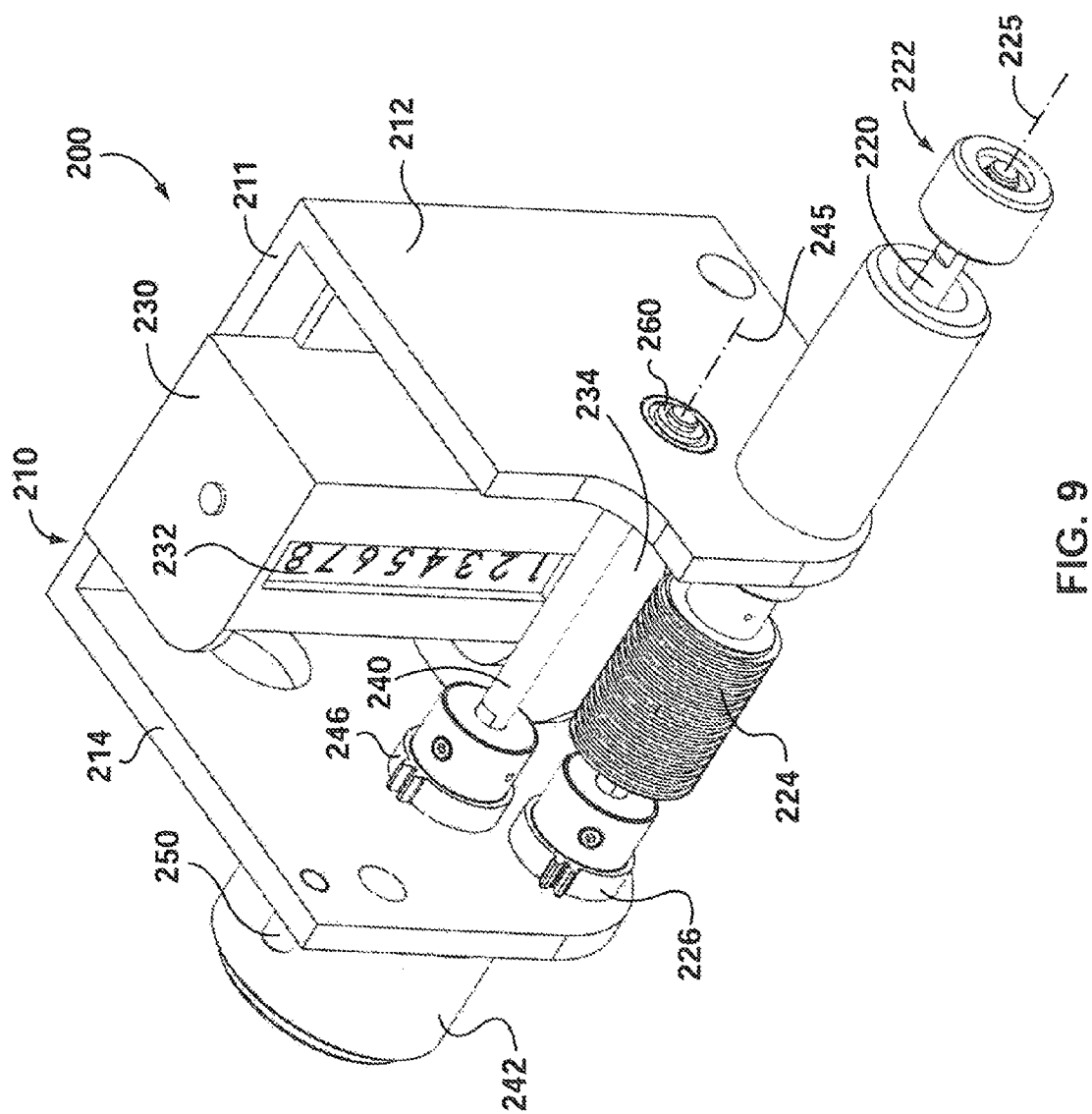
FIG. 9 is another perspective view of the backup counter module of FIG. 8.

Turning to FIG. 9, also mounted on driven shaft 220 is a driven gear 226, which meshes with an output gear 246 (in the Figures, most of the gear teeth have been omitted for clarity). Thus, rotation of driven shaft 220 results in a proportional rotation of output shaft 240. While the illustrated embodiment has two gears providing a 1:1 ratio it will be appreciated that other gear arrangements and/or other gear ratios may be used.

Also notable in the arrangement shown is that the longitudinal axis 225 of driven shaft 220 is offset from the longitudinal axis 245 of output shaft 240. Such an arrangement may have a number of advantages. For example, in this arrangement the location of magnet holder 242 is offset from the position of the end 222 of driven shaft 220 that, in use, is coupled to a counter drive shaft of a gas meter. As will be discussed further below, a backup counter module 200 with offset driven and output shafts may facilitate the use of backup counter module 200 with a number of different sized of gas meter bodies. Also, offsetting the shafts 220, 240 may reduce the overall size of backup counter module 200.

Turning to FIG. 10, a magnet holder 242 is mounted to output shaft 240 at the output end 204 of backup counter module 200. Thus, rotation of driven shaft 220 (e.g. when coupled to and driven by a counter drive shaft of a gas meter body) results in: i) incrementation of mechanical counter 230; and ii) rotation of magnet holder 242. While any desired gearing may be provided, the gear ratio between driven shaft 220 and mechanical counter 230 is preferably 100:1 (i.e. 100 rotations of driven shaft 220 results in mechanical counter being incremented by one digit), and the gear ratio between driven shaft 220 and magnet holder 242 is preferably 1:1.

As shown in FIGS. 8-11, worm 224, gears 226, and/or magnet holder 242 may be mounted to their respective shafts using set screws, flats, and/or keys and keyways. It will be appreciated that any suitable mounting system may be used, such as splined shafts.

Turning to FIG. 11, also provided at the output end 204 are protrusions 250, 256. These protrusions cooperate with engagement features 120a-c, 126a-c to secure backup counter module 200 in one of a number of backup counter module position 130a-c (see e.g. FIGS. 7A-C). In the illustrated embodiment, backup counter module 200 may be secured in housing 110 by positioning protrusions 250, 256 within recesses 122a, 128a, within 122b, 128b, or within 122c, 128c. As discussed above this allows backup counter module 200 to be secured in one of a number of backup counter module position 130a-c.

Figure 13:
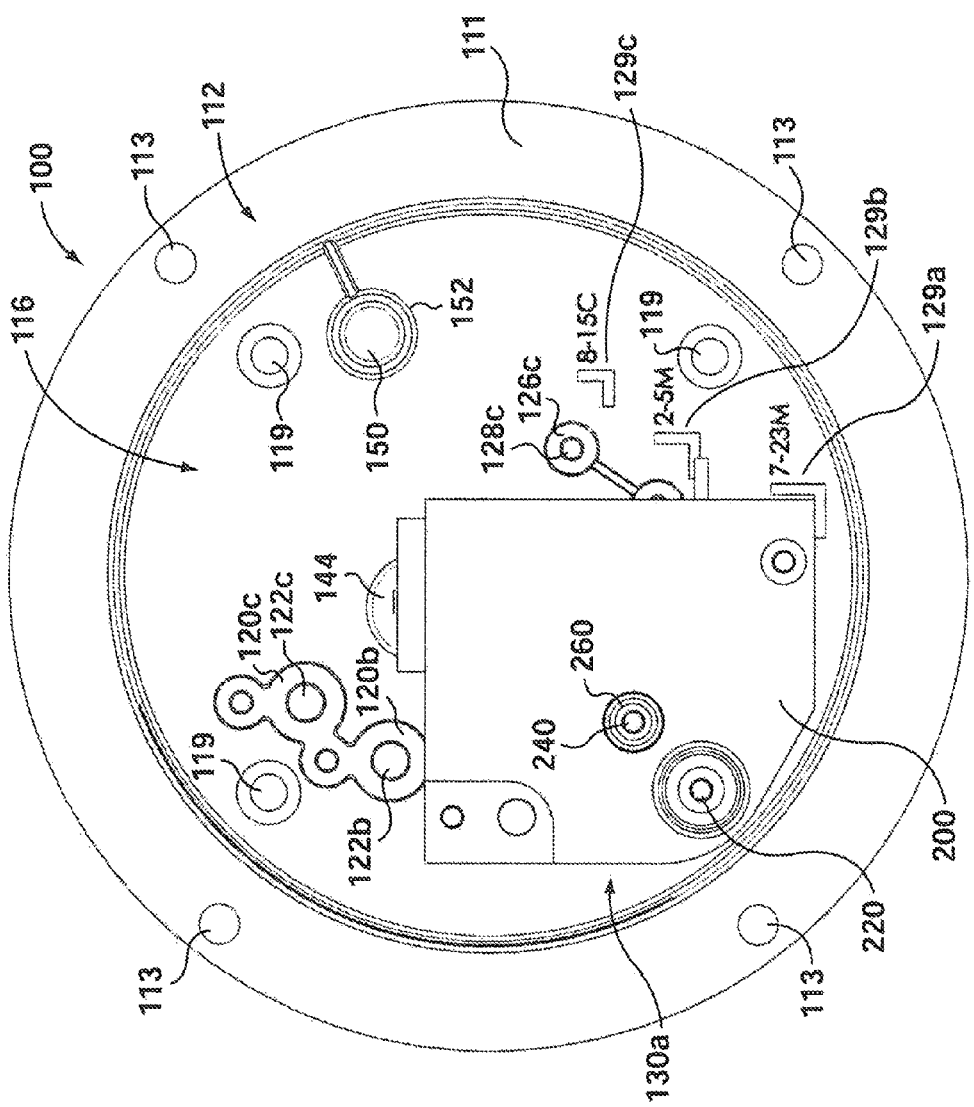
FIG. 13 is an end view of the apparatus of FIG. 5 with a backup counter module secured in a first backup counter module position.
Figure 14:
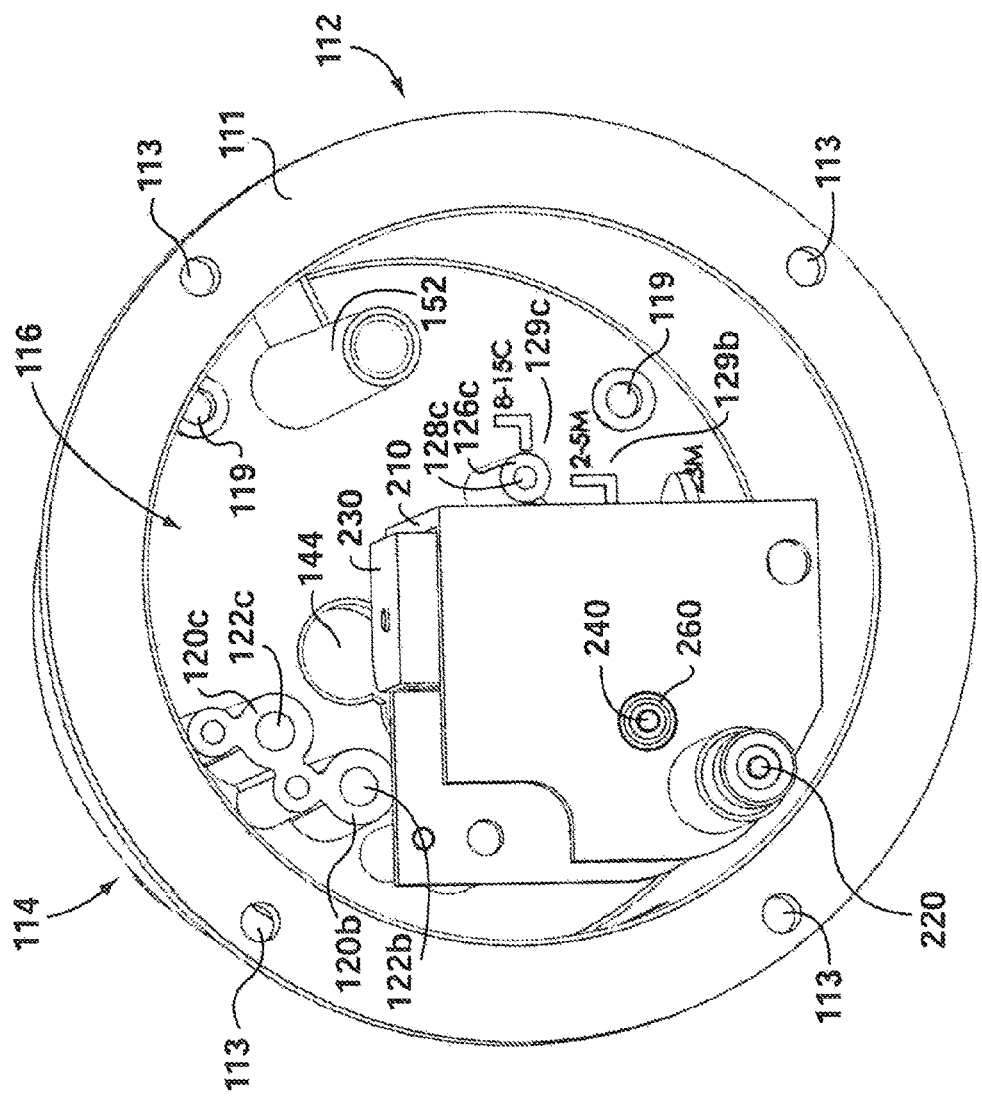
FIG. 14 is a perspective view of the apparatus of FIG. 5 with a backup counter module secured in a first backup counter module position.
Figure 15:
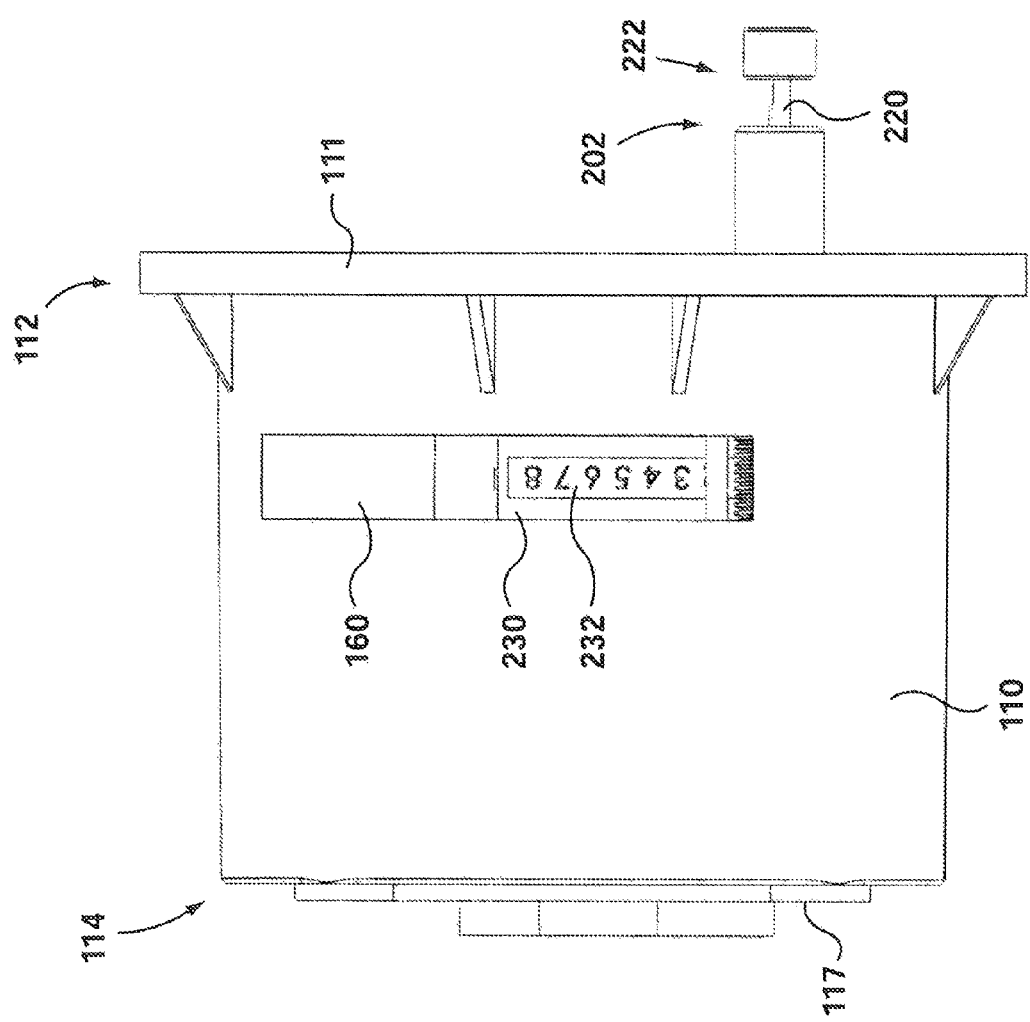
FIG. 15 is a side view of the apparatus of FIG. 5 with a backup counter module secured in a first backup counter module position.
Figure 16:
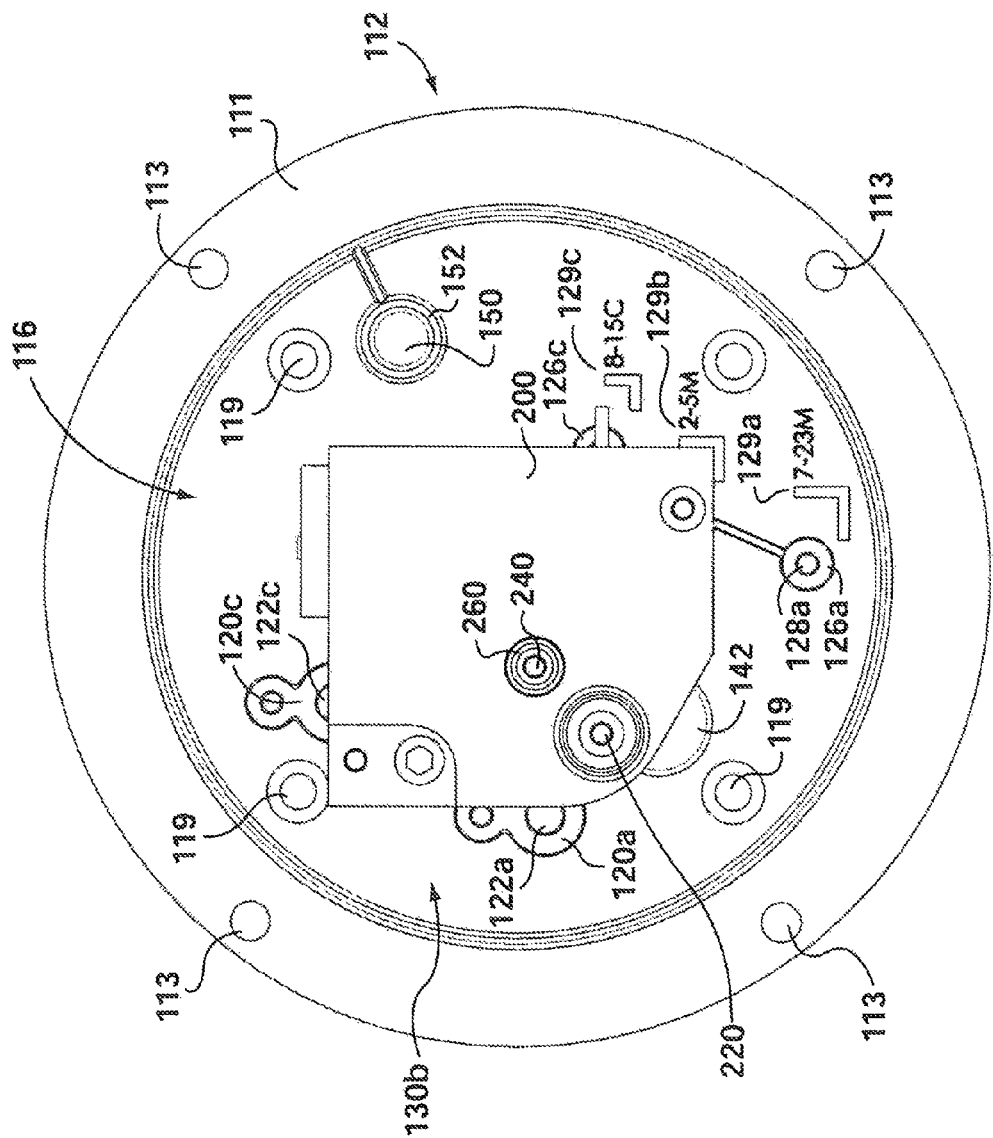
FIG. 16 is an end view of the apparatus of FIG. 5 with a backup counter module secured in a second backup counter module position.
Figure 17:
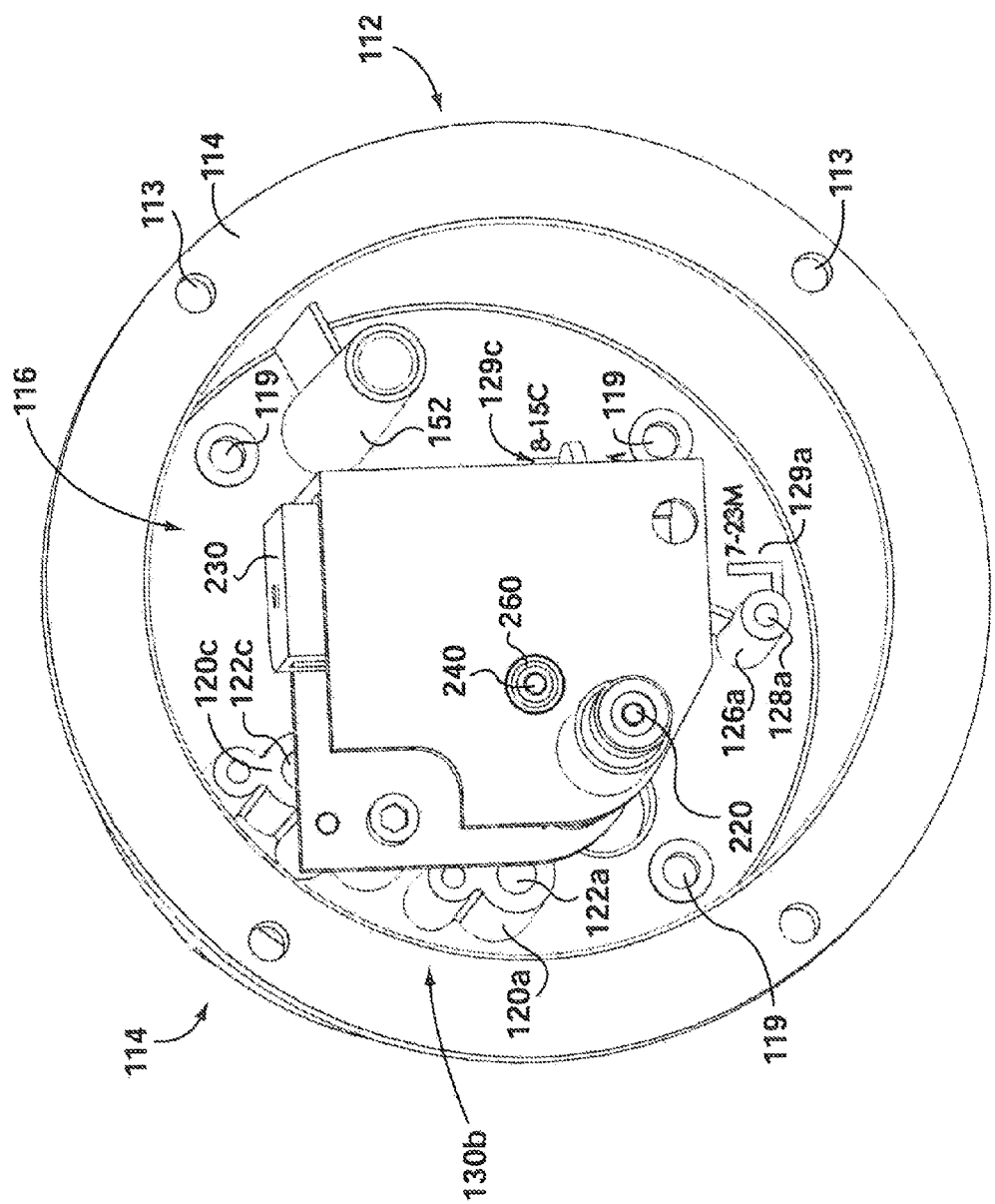
FIG. 17 is a perspective view of the apparatus of FIG. 5 with a backup counter module secured in a second backup counter module position.
Figure 18:
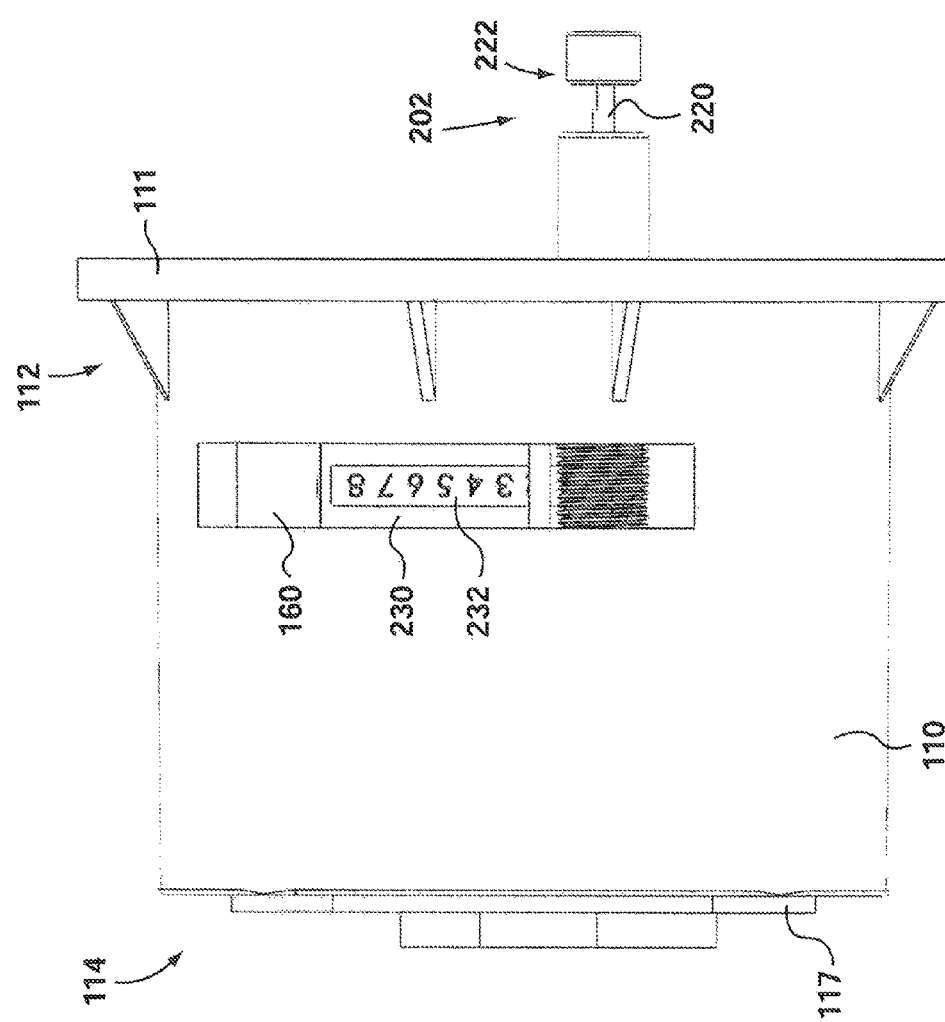
FIG. 18 is a side view of the apparatus of FIG. 5 with a backup counter module secured in a second backup counter module position.
Figure 19:
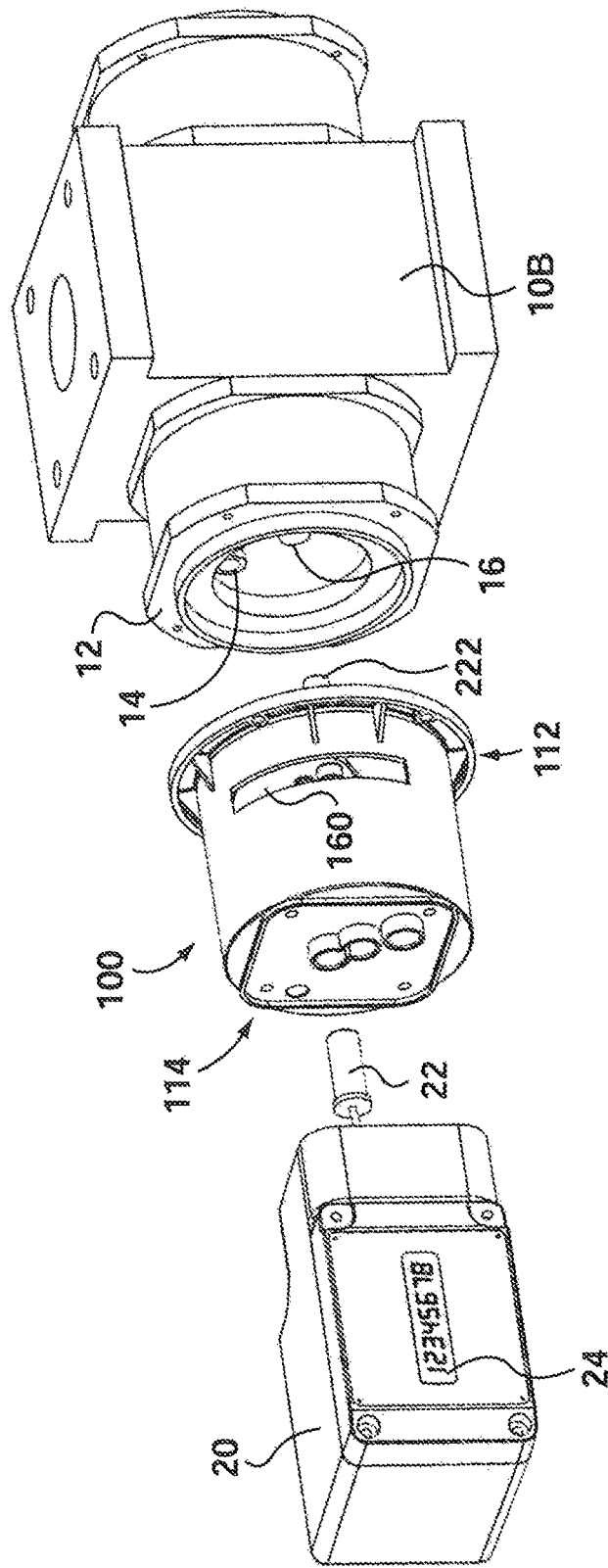
FIG. 19 is a partially exploded view of an electronic counter module, a second gas meter body, and the apparatus and backup counter module of FIG. 16 positioned between the electronic counter module and the gas meter body.
Figure 20:
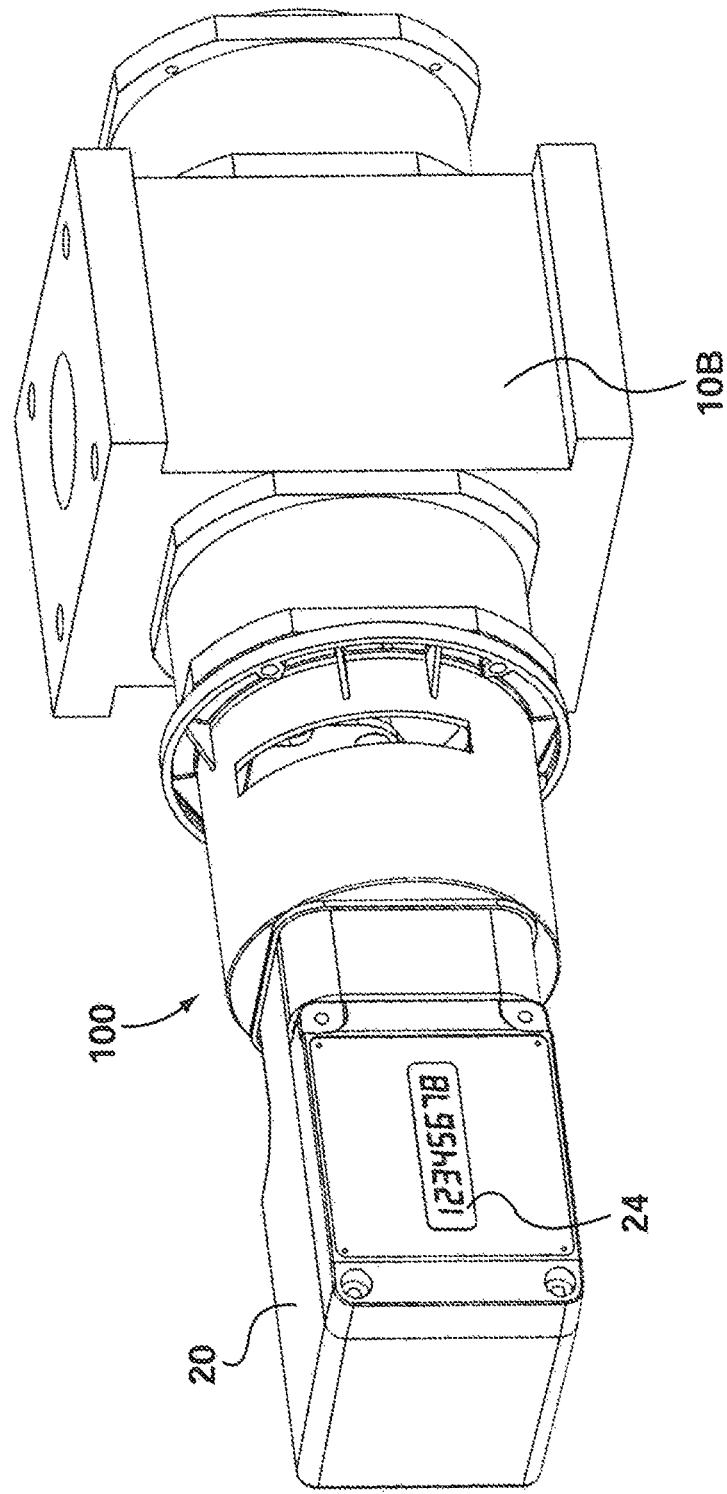
FIG. 20 is a perspective view of the electronic counter module, apparatus and backup counter module, and gas meter body of FIG. 19.
Figure 21:
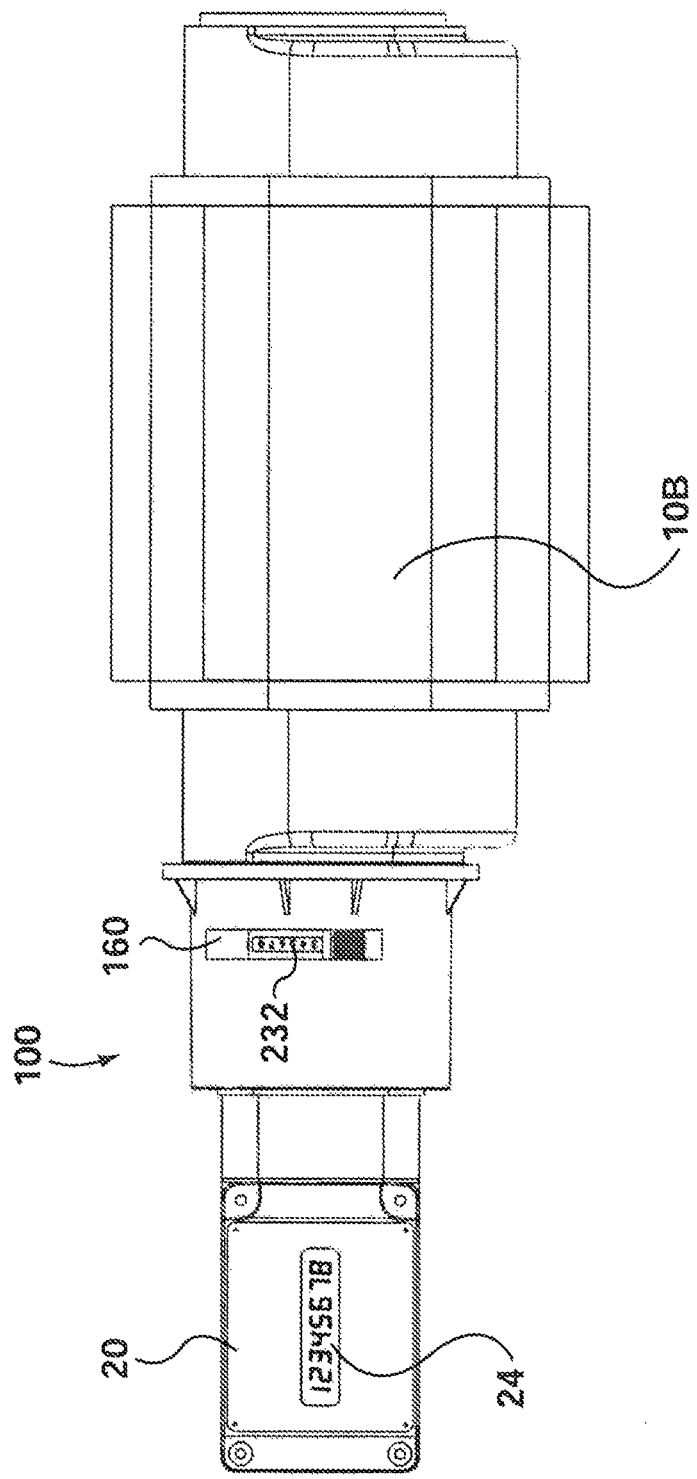
FIG. 21 is a side view of the electronic counter module, apparatus and backup counter module, and gas meter body of FIG. 18.
Figure 22:
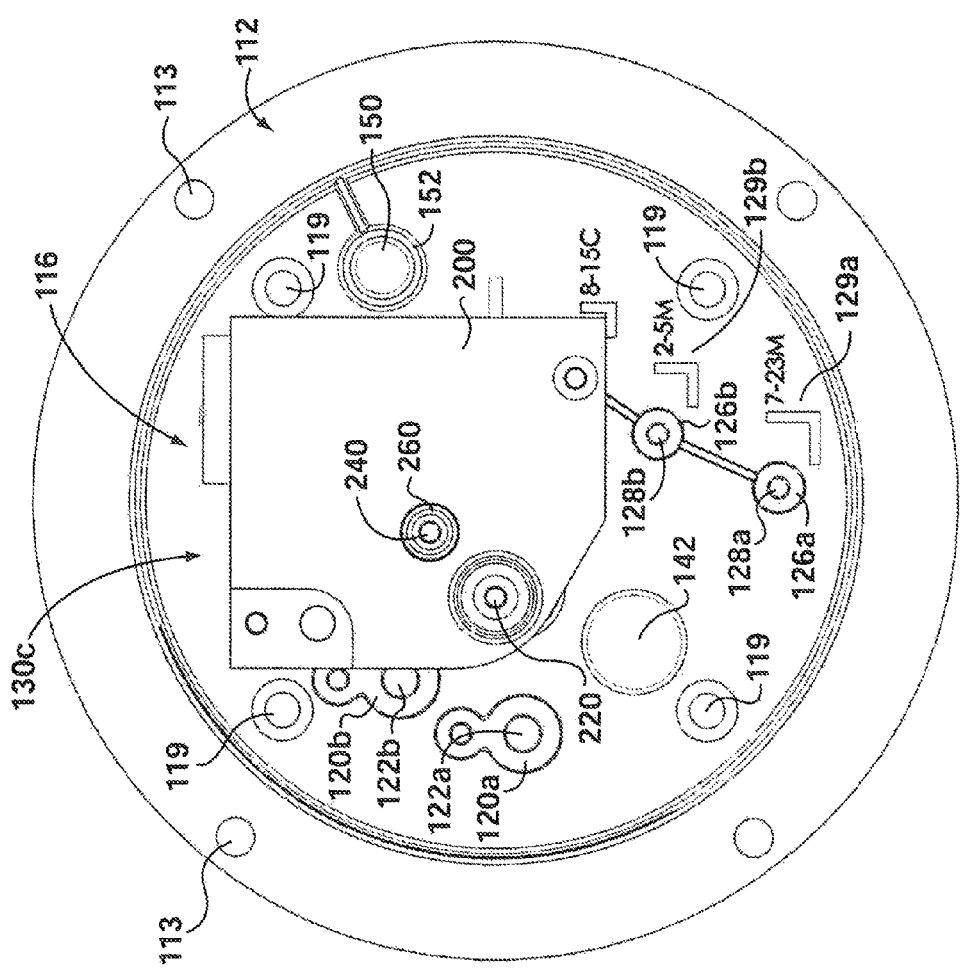
FIG. 22 is an end view of the apparatus of FIG. 5 with a backup counter module secured in a third backup counter module position.
Figure 23:
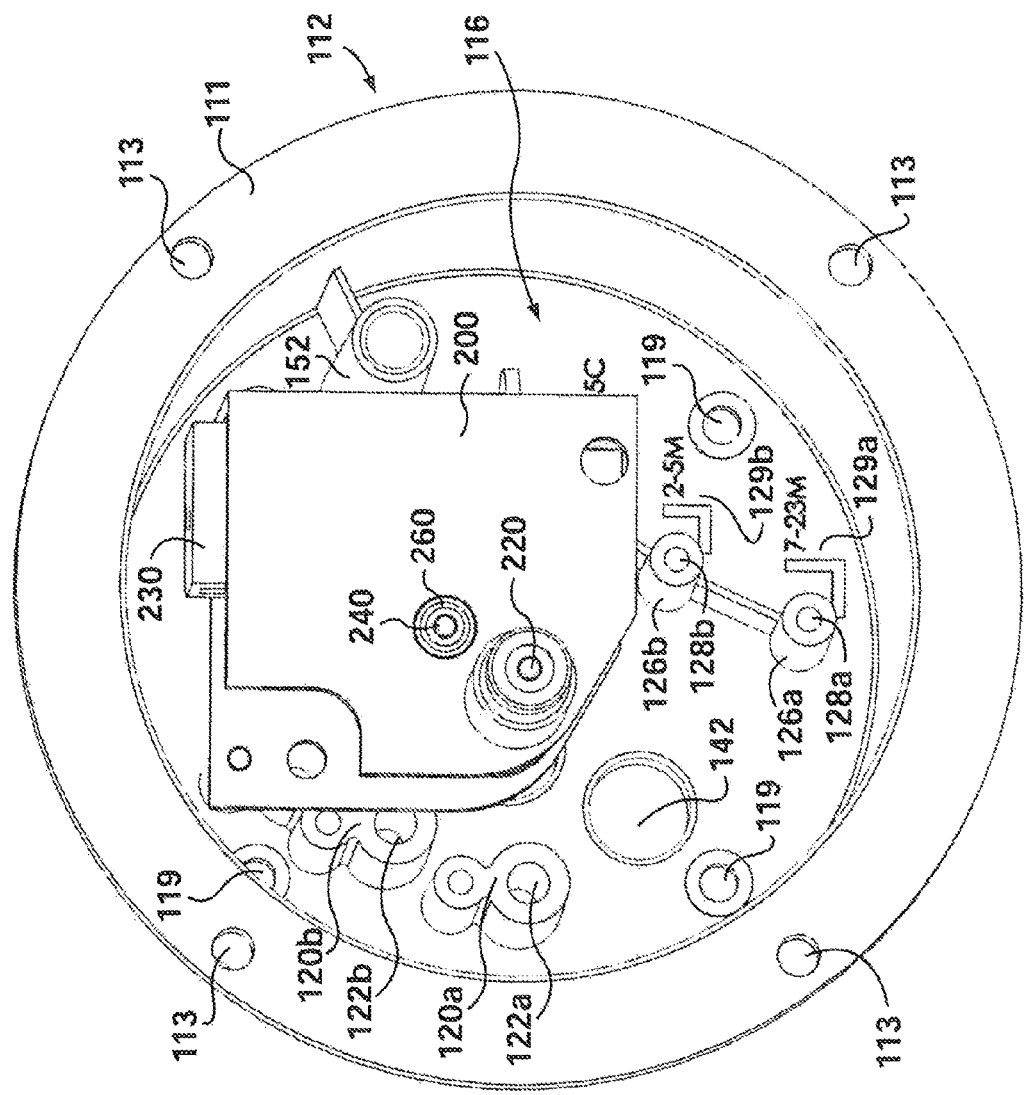
FIG. 23 is a perspective view of the apparatus of FIG. 5 with a backup counter module secured in a third backup counter module position.
Figure 24:
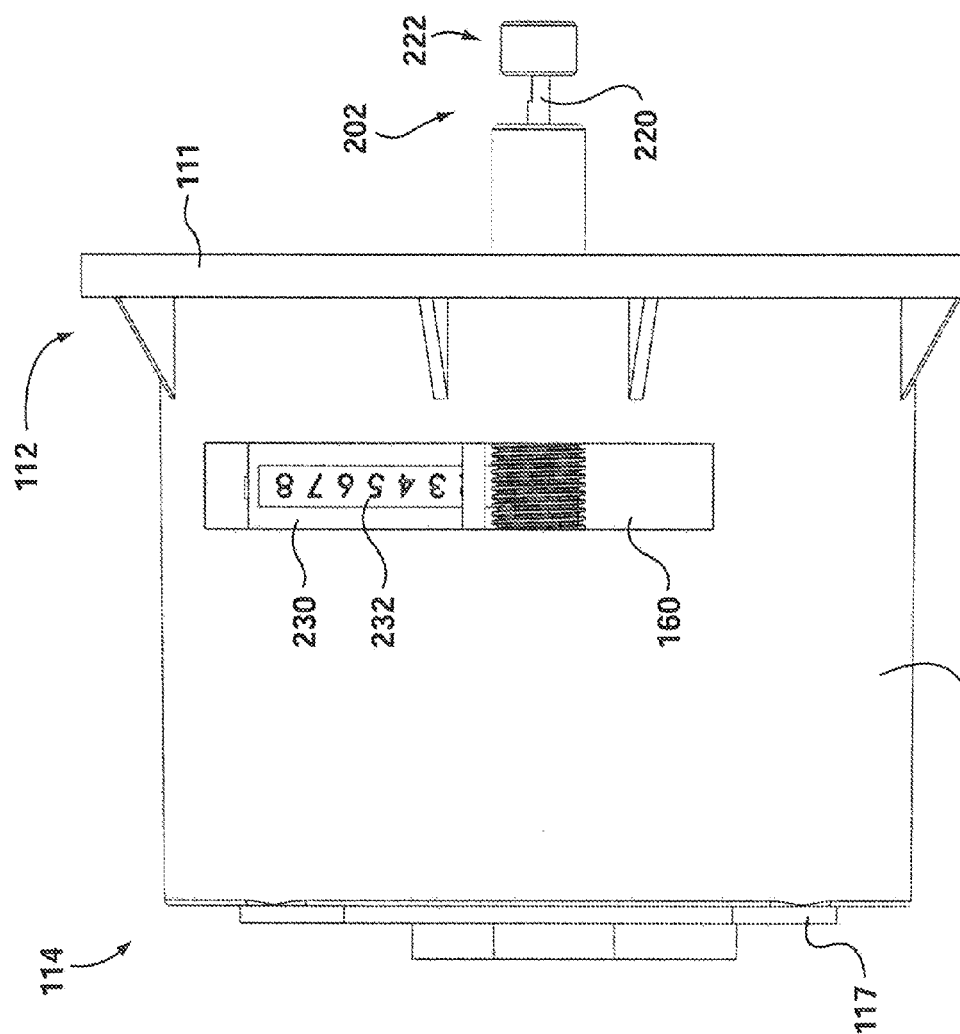
FIG. 24 is a side view of the apparatus of FIG. 5 with a backup counter module secured in a third backup counter module position.
Figure 25:
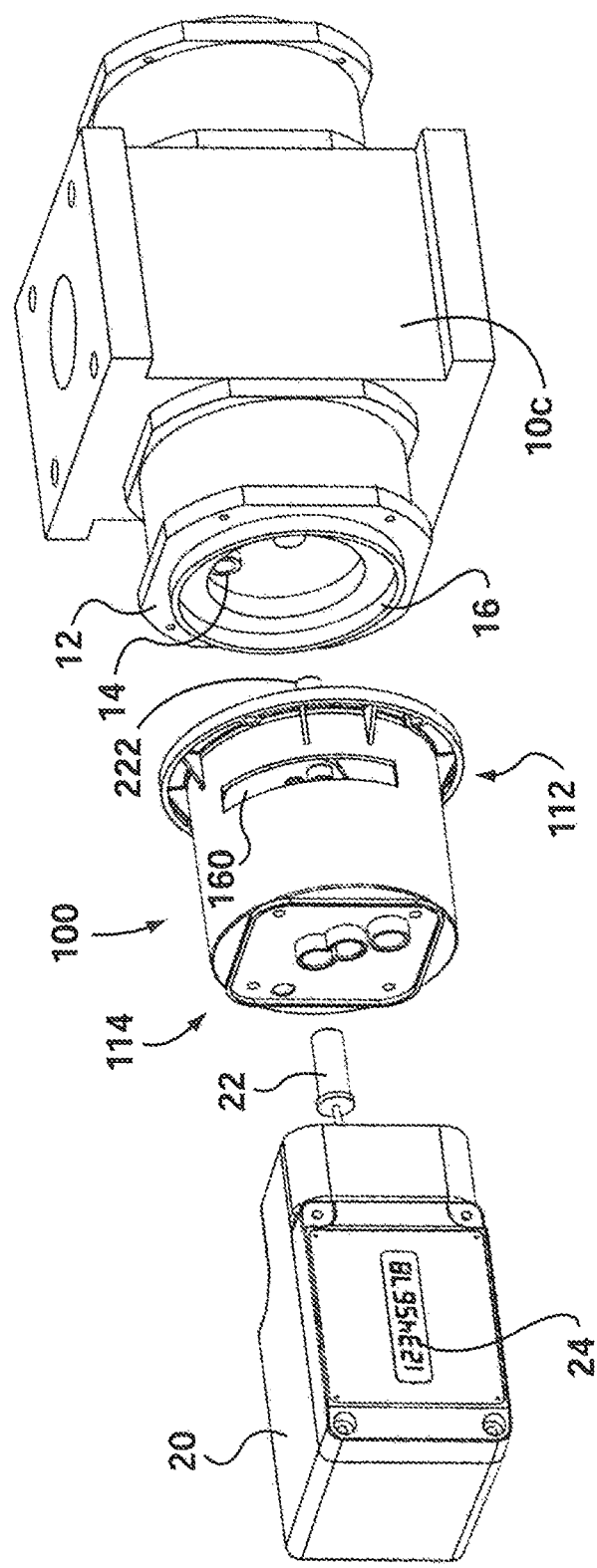
FIG. 25 is a partially exploded view of an electronic counter module, a third gas meter body, and the apparatus and backup counter module of FIG. 22 positioned between the electronic counter module and the gas meter body.
Figure 26:
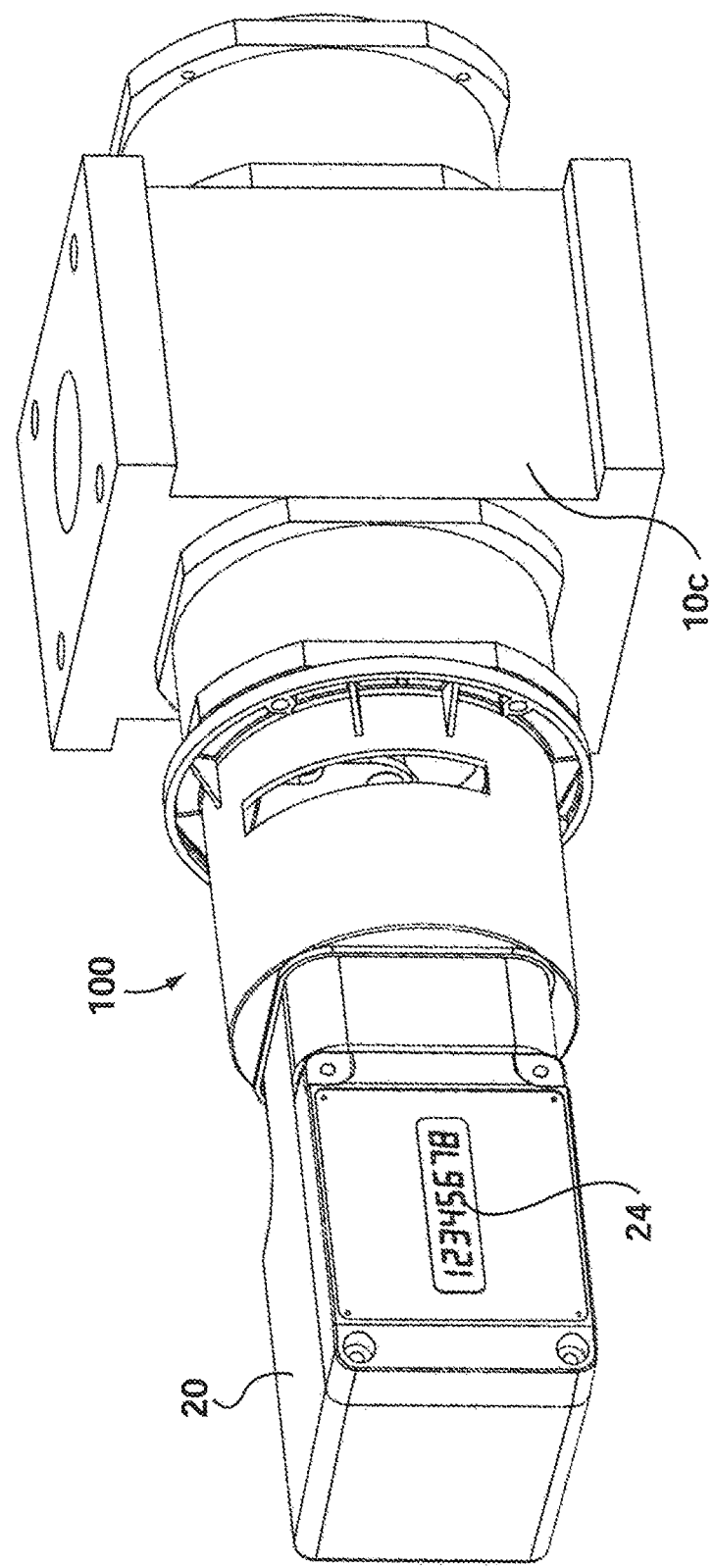
FIG. 26 is a perspective view of the electronic counter module, apparatus and backup counter module, and gas meter body of FIG. 25.
Figure 27:
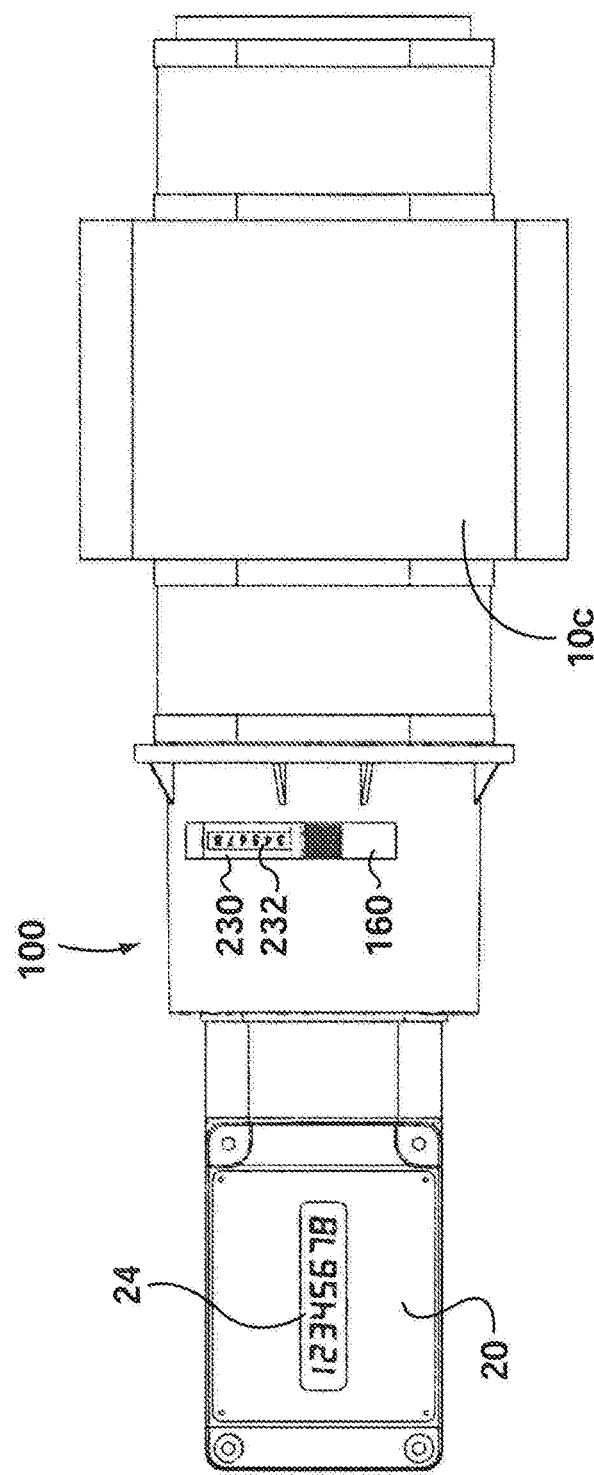
FIG. 27 is a side view of the electronic counter module, apparatus and backup counter module, and gas meter body of FIG. 25.

For example, as shown in FIGS. 13-15, backup counter module 200 may be secured in a first backup counter module position 130a by positioning protrusions 250, 256 within recesses 122a, 128a of engagement features 120a, 126a, respectively. As perhaps best seen in FIG. 13, by providing a reference against which a corner of frame 210 can be aligned, visual aid 129a may assist in positioning backup counter module 200 into position for insertion into engagement features 120a, 126a.

The location of the end 222 of output shaft 220 relative to the first end 112 of housing 110 when backup counter module 200 is secured in first backup counter module position 130a is significant. More specifically, the relative position of end 222 and flange 111 allows housing 110 with backup counter module 200 secured in backup counter module position 130a to be coupled to a gas meter body having a counter drive shaft in a complementary position relative to a mounting surface. For example, as perhaps best seen in FIG. 2, gas meter body 10A has an aperture 16 for providing access to a counter drive shaft in certain relative position to mounting surface 12.

Also significant when backup counter module 200 is secured in backup counter module position 130a is the location of magnet holder 242 relative to the inner surface 116 of housing 110. More specifically, the relative position of magnet holder 242 and aperture 142 allows magnetic sensor 22 of electronic counter module 20 to be positioned in aperture 142 (see e.g. FIG. 2) such that the magnetic sensor 22 is operable to track the rotation of output shaft 240 via the rotation of a magnet held in magnet holder 242. For example, a Wiegand magnet and corresponding magnet sensor may be used, although any suitable tracking system may alternatively be used.

Thus, with the backup counter module 200 secured in position 130a, apparatus 100 and backup counter module 200 may be coupled to gas meter body 10A and used to i) track the relative rotation of the counter drive shaft via mechanical counter 230; and ii) allow electronic counter module 20 to track the relative rotation of the counter drive shaft via the rotation of a magnet positioned in magnet holder 242.

Advantageously, the same apparatus 100 and backup counter module 200 may alternatively be used with a gas meter body having a different relative positioning of its counter drive shaft and mounting surface. For example, this may be a gas meter body of a different size, and/or a different model of gas meter.

For example, as shown in FIGS. 16-21, backup counter module 200 may be secured in a second backup counter module position 130b by positioning protrusions 250, 256 within recesses 122b, 128b of engagement features 120b, 126b, respectively. As perhaps best seen in FIG. 16, by providing a reference against which a corner of frame 210 can be aligned, visual aid 129b may assist in positioning backup counter module 200 into position for insertion into engagement features 120b, 126b.

As with first backup counter module position 130a, the location of the end 222 of output shaft 220 relative to the first end 112 of housing 110 when backup counter module 200 is secured in second backup counter module position 130b is significant. More specifically, the relative position of end 222 and flange 111 allows housing 110 with backup counter module 200 secured in backup counter module position 130b to be coupled to a gas meter body having a counter drive shaft in a complementary position relative to a mounting surface. For example, as perhaps best seen in FIG. 19, the relative position of aperture 16 and mounting surface 12 for gas meter body 10B is different than their relative position on gas meter body 10A.

Also, when backup counter module 200 is secured in second backup counter module position 130b, the relative position of magnet holder 242 and aperture 144 allows magnetic sensor 22 of electronic counter module 20 to be positioned in aperture 144b (see e.g. FIG. 19) such that the magnetic sensor 22 is operable to track the rotation of output shaft 240 via the rotation of a magnet held in magnet holder 242.

Thus, with the backup counter module 200 secured in position 130b, apparatus 100 and backup counter module 200 may be coupled to gas meter body 10B and used to i) track the relative rotation of the counter drive shaft via mechanical counter 230; and ii) allow electronic counter module 20 to track the relative rotation of the counter drive shaft via the rotation of a magnet positioned in magnet holder 242.

Similarly, as shown in FIGS. 22-27, backup counter module 200 may be secured in a third backup counter module position 130c by positioning protrusions 250, 256 within recesses 122c, 128c of engagement features 120c, 126c, respectively. As perhaps best seen in FIG. 22, by providing a reference against which a corner of frame 210 can be aligned, visual aid 129c may assist in positioning backup counter module 200 into position for insertion into engagement features 120c, 126c.

Again, the location of the end 222 of output shaft 220 relative to the first end 112 of housing 110 when backup counter module 200 is secured in third backup counter module position 130c is significant. More specifically, the relative position of end 222 and flange 111 allows housing 110 with backup counter module 200 secured in backup counter module position 130c to be coupled to a gas meter body having a counter drive shaft in a complementary position relative to a mounting surface. For example, as perhaps best seen in FIG. 25, the relative position of aperture 16 and mounting surface 12 for gas meter body 10C is different than their relative position on either of gas meter bodies 10A or 10B.

Also, when backup counter module 200 is secured in third backup counter module position 130c, the relative position of magnet holder 242 and aperture 144 allows magnetic sensor 22 of electronic counter module 20 to be positioned in aperture 144a (see e.g. FIG. 25) such that the magnetic sensor 22 is operable to track the rotation of output shaft 240 via the rotation of a magnet held in magnet holder 242.

By allowing backup counter module 200 to be alternatively secured within housing 110 in more than one backup counter module position, the same apparatus 100 and backup counter module 200 may alternatively be used with a gas meter body having a different relative positioning of its counter drive shaft and mounting surface.

For example, a manufacturer of gas meter bodies may provide a common mounting surface on a number of models and/or sizes of gas meter bodies. However, based on the relative location of the impeller within the gas meter body, the location of the counter drive shaft relative to the mounting surface may be different for different models and/or sizes of gas meter bodies. For example, compare and contrast the relative locations of mounting surfaces 12 and counter drive shafts 16 in FIGS. 2, 19, and 25.

However, the differing relative positions of counter drive shafts may present problems for the installation of a mechanical counter between the gas meter body and an electronic counter module. For example, a different mechanical counter module and/or a different housing may be required for each different model and/or size of gas meter bodies having different relative mounting surface/counter drive shaft arrangements.

The ability to use the same universal apparatus 100 and backup counter module 200 with gas meter bodies having different relative positioning of their respective counter drive shafts and mounting surfaces may have a number of advantages.

For example, the ability to use a universal apparatus 100 and backup counter module 200 with multiple gas meter bodies may reduce the number of different mechanical counter modules and/or housings that are required to be brought to a customer's facility when installing and/or repairing backup counter modules, as the same parts may be used with a wide variety of gas meters.

Also, as noted above, an advantageous result of using a backup counter module with a display oriented transverse to a driven shaft is that display is located the same distance along the housing 110 regardless of which backup counter module position it is secured in. As seen in e.g. FIGS. 4, 21, and 27, this allows display 232 to be visible through a relatively small viewing window 160 in housing 110 regardless of which backup counter module position 130a-c the backup counter module 200 is secured in.

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A backup counter module having an input end and an output end, the backup counter module comprising:
   a frame;
   a driven shaft mounted to the frame and having an end for coupling to a counter drive shaft of a gas meter body, the driven shaft end located at the input end of the backup counter module;
   a mechanical counter mounted to the frame and coupled to the driven shaft so that rotation of the driven shaft increments a value of the mechanical counter proportionally to the rotation of the driven shaft;
   an output shaft connected to the driven shaft through a gear train so that rotation of the driven shaft results in a proportional rotation of the output shaft, the output shaft having a mount for receiving a magnet so that the magnet rotates in direct proportion to rotation of the output shaft, the mount located at the output end of the backup counter module; and
   one or more housing engagement features at the output end of the backup counter module for securing the output end of the backup counter module in one of at least two backup counter module positions within a housing.

2. The backup counter module of claim 1, wherein the one or more housing engagement features comprise at least one protrusion for insertion into a complimentary recess on a housing.

3. The backup counter module of claim 1, wherein the magnet comprises a magnet for use with a Wiegand sensor.

4. The backup counter module of claim 1, wherein a longitudinal axis of the driven shaft and a longitudinal axis of the output shaft are offset.

5. The backup counter module of claim 1, wherein the frame comprises a frame base and two frame plates extending from the frame base, and wherein the driven shaft extends through one of the two frame plates and is connected to the other of the two frame plates via a bearing.

6. The backup counter module of claim 1, wherein the gear train is configured such that the output shaft rotates at the same speed as the driven shaft.

* * * * *